United States Patent
Ito

(10) Patent No.: US 6,987,529 B1
(45) Date of Patent: Jan. 17, 2006

(54) CAMERA HAVING SHAKE CORRECTION DEVICE MOUNTED THEREON

(75) Inventor: Junichi Ito, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/578,466

(22) Filed: May 25, 2000

(30) Foreign Application Priority Data

May 28, 1999 (JP) ............................... 11-149996

(51) Int. Cl.
*H04N 5/228* (2006.01)

(52) U.S. Cl. .................... 348/208.2; 348/180; 348/187; 348/188; 348/208.4; 348/208.7; 396/54; 396/55

(58) Field of Classification Search ................. 348/180, 348/187, 188, 208.1, 208.2, 208.3, 208.4, 348/208.13, 208.16, 208.7, 208.8, 208.11, 348/208.99; 396/52; 359/554, 557
See application file for complete search history.

(56) References Cited

U.S. PATENT DOCUMENTS

| | | | | |
|---|---|---|---|---|
| 5,210,563 A | * | 5/1993 | Hamada et al. ............... 396/53 |
| 5,672,862 A | * | 9/1997 | Ohara et al. ................. 250/204 |
| 5,731,920 A | * | 3/1998 | Katsuragawa ............... 359/827 |
| 5,861,915 A | * | 1/1999 | Sato et al. ............... 348/208.2 |
| 5,867,213 A | * | 2/1999 | Ouchi ...................... 348/208.5 |
| 5,883,733 A | * | 3/1999 | Hwang ........................ 359/307 |
| 6,233,009 B1 | * | 5/2001 | Morofuji et al. ......... 348/208.8 |
| 6,243,132 B1 | * | 6/2001 | Lee et al. .............. 348/208.11 |
| 6,343,188 B1 | * | 1/2002 | Morofuji ..................... 396/55 |

FOREIGN PATENT DOCUMENTS

JP        6-148730        5/1994

* cited by examiner

*Primary Examiner*—Wendy R. Garber
*Assistant Examiner*—Chriss S. Yoder
(74) *Attorney, Agent, or Firm*—Frishauf, Holtz, Goodman & Chick, P.C.

(57) ABSTRACT

A camera of this invention is a camera containing a shake correction device for correcting the shake by reading out application voltage data corresponding to a detected shake amount by use of parameters stored in an EEPROM indicating the relation between a voltage applied to a wedge prism and a deflection angle of a light beam and applying a voltage subjected to the temperature correcting process to the wedge prism to change the index of refraction of the wedge prism and deflect the light beam in a direction opposite to the shake direction. The parameters are determined by deriving the relation between the application voltage and the inclination of the light beam by detecting the inclination of a reference light beam from the illuminating position of the image sensing device while changing the index of refraction of the wedge prism by applying a voltage to the wedge prism and then stored into an EEPROM as a data table

3 Claims, 16 Drawing Sheets

CAMERA HAVING SHAKE CORRECTION DEVICE MOUNTED THEREON

CROSS-REFERENCE TO RELATED APPLICATIONS

This application is based upon and claims the benefit of priority from the prior Japanese Patent Application No. 11-149996, filed May 28, 1999, the entire contents of which are incorporated herein by reference.

BACKGROUND OF THE INVENTION

This invention relates to a shake (or jiggle) correction device mounted on an optical device such as a camera and more particularly to a shake correction device for correcting the deterioration of an image due to shake by use of a wedge prism whose index of refraction is electrically changed.

Conventionally, when photographing is made by use of a camera held in hand, a problem of deterioration of an image due to shake caused at the time of photo-graphing occurs and various techniques are developed to solve the problem. The shake correction technique is widely applied to an optical device such as a binocular in addition to a camera.

Generally, in a film camera, a technique using a shake preventing lens which is disposed in a photo-graphing lens system and moves to prevent the vibration of an image and a driving mechanism for driving the lens is known.

However, use of the driving mechanism for the shake preventing lens makes the photographing lens system larger and since the lens is mechanically driven by the driving mechanism, the movement of the lens cannot follow the shake and a time delay occurs in the shake preventing operation in some cases.

Further, in a camera having an image sensing device such as a CCD, there is provided a shake correction device in which a light receiving area (total pixel number) of the CCD image sensing device is set larger than a light receiving area (effective pixel number) for actually converting received light into an image and which is used for detecting a movement vector of image data photographed by pixels in a preset position and correcting the image itself by an electrical process. However, in the shake correction device utilizing the image sensing device, there occurs a problem that the image quality is lowered and the image processing operation is complicated.

In Jpn. Pat. Appln. KOKAI Publication No. 06-148730 filed by the applicant of this invention, there is proposed an optical shake correction device as the shake correction device using an electrical polarizing member, that is, a liquid crystal prism (wedge prism) which can change the inclination of a light beam passing therethrough according to a voltage applied thereto without using a mechanical driving mechanism.

The shake correction technique is a technique for using a wedge prism formed by sealing a liquid crystal which is an optical anisotropic medium into a space defined by two glass plates combined to form a wedge shape and applying a voltage corresponding to a detection signal detected by an acceleration sensor to the wedge prism so as to,change the index of refraction and deflect the light beam in a direction opposite to the shake direction, thus moving the image to correct the shake.

When the wedge prism in the technology disclosed in Jpn. Pat. Appln. KOKAI Publication No. 06-148730 is used, there occurs a problem that the wedge prism must be driven by use of the open loop control process.

That is, in a conventional vibration preventing device of a type for driving the lens or displacing part of the optical system, a correction amount can be detected by use of some sensor. By feeding back the correction amount, an adequate correction amount can be controlled.

However, in the wedge prism, since the external shape does not change even if a voltage is applied thereto, the correction amount cannot be fed back and it is impossible to monitor whether or not the wedge prism inclines the light beam as designed.

Further, a variation occurs in the physical characteristic of the wedge prism caused at the time of manufacturing and the characteristic cannot be unconditionally set.

Therefore, when the wedge prism is used in the shake correction device of the camera, it is necessary to previously get information on the relation between the driving voltage and the inclination of the light beam passing through the wedge prism for each wedge prism.

BRIEF SUMMARY OF THE INVENTION

An object of this invention is to provide a shake correction device for acquiring and holding parameters indicating the relation between the deflection angle of a light beam and an application voltage to each wedge prism used in the shake correction device mounted on an optical device such as a camera and correcting a shake correction amount based on a shake amount detected at the time of shake correction according to the parameters to effect an adequate shake correction process.

In order to attain the above object, this invention provides a shake correction device comprising: an image sensing device for converting a subject image to image data; a shake detecting section for detecting a shake state; a prism portion for changing an angle of a light beam passing therethrough according to a voltage applied thereto; an application voltage generating section for generating a voltage applied to the prism portion; a storage section for storing the relation between the voltage applied to the prism portion and the deflection angle of the light beam passing through the prism portion; a control section for determining a voltage to be applied to the prism portion based on an output of the shake detecting section and an output of the storage section and controlling the voltage generating section to generate the thus determined application voltage; and a setting section for selectively setting one of an image sensing mode for image-sensing the subject image and a test mode for measuring the relation between the voltage applied to the prism portion and the deflection angle of the light beam passing through the prism portion which is stored in the storage section by use of the image sensing device.

Further, this invention provides an electronic still camera comprising: an image sensing device for converting a subject image to image data; a shake detecting section including a first shake angle detecting section for detecting a shake angle in a first axial direction and a second shake angle detecting section for detecting a shake angle in a second axial direction perpendicular to the first axial direction; a prism portion for changing an angle of a light beam passing therethrough according to a voltage applied thereto; a temperature measuring circuit for measuring a temperature of the prism portion; an application voltage generating section for generating a voltage applied to the prism portion; a storage section for storing the relation between the voltage applied to the prism portion, the deflection angle of a light beam passing through the prism portion and the temperature of the prism portion; a control section for determining a voltage to be applied to the prism portion based on an output of the shake detecting section and an output of the storage section and controlling the voltage generating section to generate the thus determined application voltage; and a setting section for selectively setting one of an image sensing mode for image-sensing the subject image and a test mode for measuring the relation between the voltage applied to the prism portion and the deflection angle of the light beam passing through the prism portion which is stored in the storage section by use of the image sensing device.

In the shake correction device with the construction described above, the parameters indicating the relation between the voltage applied to the wedge prism and the inclination angle of a light beam is stored in the storage section. When a shake amount in the optical system is detected by the shake detecting means, application voltage data corresponding to the shake amount is read out from the storage section, a voltage based on voltage data corrected according to a temperature of the camera is applied to the wedge prism so as to change the index of refraction of the wedge prism and deflect the light beam in a direction opposite to the shake direction, thus correcting the shake.

The parameters indicating the relation between the voltage applied to the wedge prism and the inclination angle of a light beam is derived by making a reference light beam incident on the optical system in which the wedge prism is disposed, applying a voltage to the wedge prism at this time to change the index of refraction thereof, measuring a distance by which the reference light beam moves from a preset position of the image sensing device disposed on the focal plane of the optical system, and determining the relation between the voltage applied to the wedge prism and the inclination angle of the light beam. The parameters are formed as a data table and stored in the storage section.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

There will now be described embodiments of this invention in detail with reference to the accompanying drawings.

Figure 1:
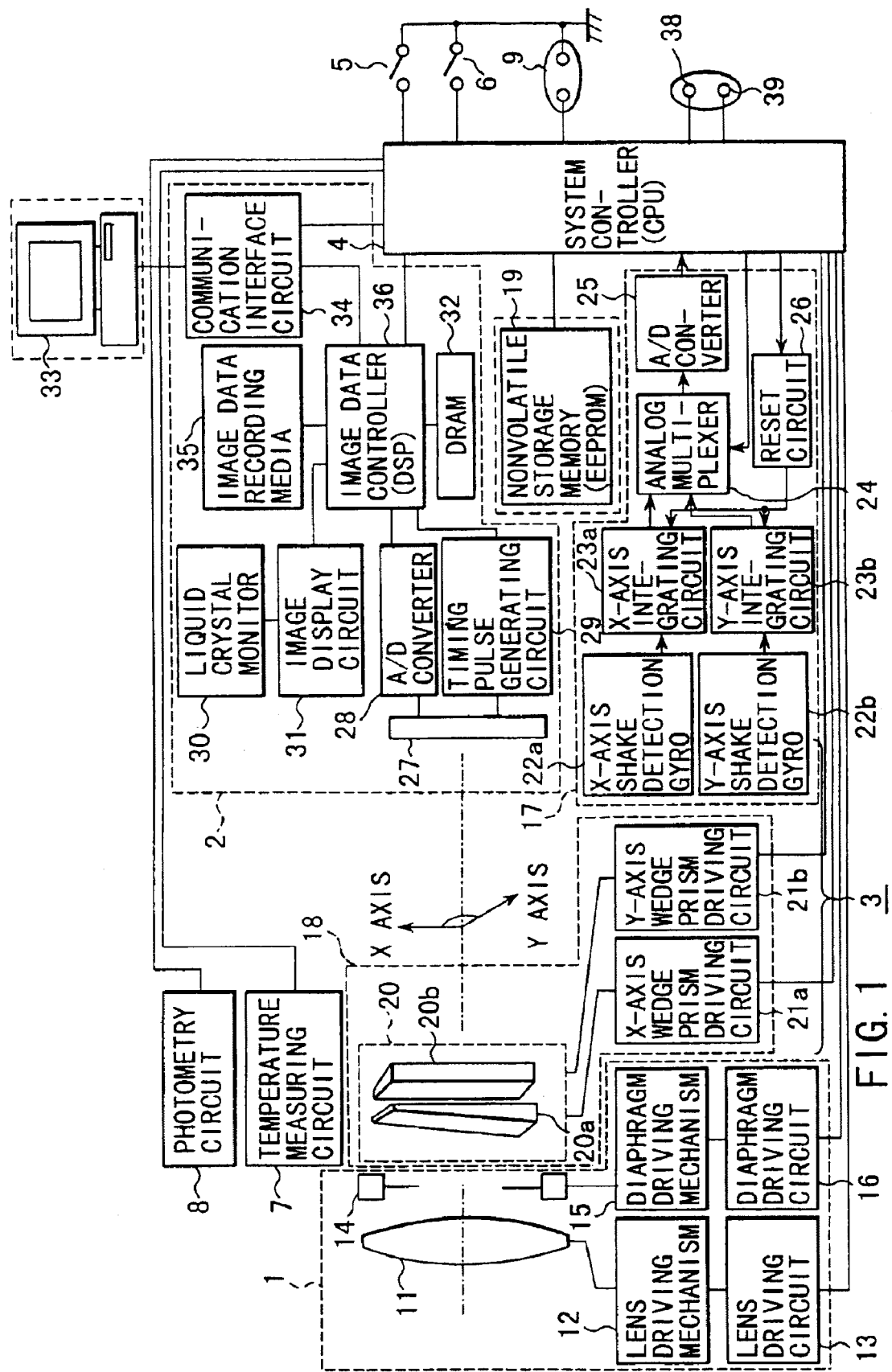
FIG. 1 is a diagram showing an example of the schematic construction of an electronic still camera containing a shake correction device according to a first embodiment of this invention.

FIG. 1 shows an example of the schematic construction of an electronic still camera containing a shake correction device as a first embodiment of this invention.

The camera roughly includes a photographing optical system 1, an image-sensing image processing section 2, a shake (or jiggle) correcting section 3, and a system controller (CPU) 4 for controlling the above constituents and the whole portion of the camera and further includes a power switch 5, a release switch 6, a temperature measuring circuit 7 for measuring the temperature of the camera, a photometry circuit 8 for measuring the luminance of a subject, and a test terminal 9 and the like which will be described later. The opening of a diaphragm 14 which will be described later and the shutter period (integrated time) of an image sensing device are determined based on luminance information obtained by the photometry circuit 8.

Since the characteristic of the index of refraction of the wedge prism varies with a change in the ambient temperature, it is necessary to make shake correction according to the temperature and the temperature measuring circuit 7 makes temperature measurements to correct a driving voltage of the wedge prism.

The photographing optical system 1 includes a photographing lens 11 for forming an image of the subject, a lens driving mechanism 12 having an actuator such as a motor for moving the photographing lens 11 to a desired position on the optical axis, a lens driving circuit 13 for driving the lens mechanism 12 under control of the CPU 4, a diaphragm 14 for controlling the light amount, a diaphragm driving mechanism 15 having an actuator such as a step motor for driving the diaphragm 14 and a diaphragm driving circuit 16 for driving the diaphragm driving mechanism 15 under control of the CPU 4 to set the diaphragm opening to a desired value.

The shake correcting section 3 includes a shake detecting portion 17, shake correcting portion 18 and nonvolatile memory (EEPROM) 19. The EEPROM 19 stores driving parameters which become necessary when a wedge prism 20 for correction which will be described later is driven.

The shake correcting portion 18 includes the wedge prism 20 and a driving circuit 21 for driving the same. The wedge prism 20 is formed by sealing a liquid crystal whose index of refraction is changed by applying a voltage thereto into a space defined by two glass plates combined to form a wedge shape and the detail thereof is described in Jpn. Pat. Appln. KOKAI Publication No. 6-148730 filed by the applicant of this invention and explained in the "BACKGROUND OF THE INVENTION" and the detail explanation thereof is omitted here.

The wedge prism 20 includes an X-axis wedge prism 20a for correcting the shake of the camera in the X direction or in the vertical direction which is perpendicular to the optical axis of the photographing lens disposed near the diaphragm 14 and a Y-axis wedge prism 20b for correcting the shake of the camera in the Y direction which is the horizontal direction perpendicular to the optical axis and X axis. The X-axis wedge prism 20a can deflect a light beam passing through the prism according to a driving signal from an X-axis prism driving circuit 21a which is controlled by the CPU 4. Likewise, the Y-axis wedge prism 20b can deflect a light beam passing through the prism according to a driving signal from a Y-axis prism driving circuit 21b.

The shake detecting portion 17 includes a shake detection gyro 22 and an integrating circuit 23 for integrating an angular speed signal detected by the gyro.

The shake detection gyro 22 includes an X-axis shake detecting gyro 22a for detecting a shake angle in the X-axis direction and a Y-axis shake detecting gyro 22b for detecting a shake angle in the Y-axis direction. The integrating circuit 23 includes an X-axis integrating circuit 23a for integrating an angular speed signal in the X-axis direction and a Y-axis integrating circuit 23b for integrating an angular speed signal in the Y-axis direction.

As the shake detecting gyro which can be used in the camera, a vibration gyro is provided as a representative example and widely used.

Further, the shake detecting portion 17 includes an analog multiplexer 24 for selecting one of two angular speed signals from the integrating circuit 23 under control of the CPU 4 as required, an A/D converter 25 for converting a selected angular speed signal into a digital signal and supplies the same to the CPU 4, and a reset circuit 26 for initializing the two integrating circuits 23.

The image-sensing image processing section 2 is explained below.

The image-sensing image processing section 2 includes an image sensing device 27 formed of a CCD or the like, an A/D converter 28 for converting a subject image (analog signal) photographed to image data which is a digital signal, a timing pulse generating circuit 29 for generating a pulse signal for driving the image sensing device 27, a liquid crystal monitor 30 for displaying a photographed image, an image display circuit 31 for driving the liquid crystal monitor 30, a DRAM 32 used for temporarily storing image data and processing and modifying the image data, a communication interface circuit 34 for making communication with an external control device 33, image data recording media 35 for recording image data, and an image data controller 36 containing a DSP for performing the modification or the like of photographed image data and control of the constituents such as the image sensing device 27 according to an instruction of the CPU 4.

Image data fetched into the DRAM 32 is converted into a preset format under control of the DSP 36 and then stored into the image data recording media 35. As the recording media, a hard disk, flash memory, floppy disk and the like can be provided.

The power switch 5 is an operation switch for determining the operative state or non-operative state of the camera system and if it is set in the ON state, the operations of the respective constituents can be effected. When the release switch 6 is set in the OFF state, the preparing operation for photographing such as the range finding and photometry is effected, and when the release switch 6 is turned ON, the image sensing process or shake correcting process is effected. The test terminal 37 is used when the measuring operation for the characteristic of the wedge prism 20 which will be described later is effected. When the test terminal 37 is short-circuited, the measuring operation can be effected. When adjustment for shake correction is made at the time of manufacturing of the camera, signals necessary for the measuring operation are output from an X-axis timing signal output terminal 38 and Y-axis timing signal output terminal 39 during the measuring operation of the wedge prism 20.

The communication interface 34 is a circuit which is used for communication with the external control device 33 represented by a personal computer (PC) and which becomes necessary when image data is transferred from the camera to the external control device 33 and then modified, for example.

Figure 2:
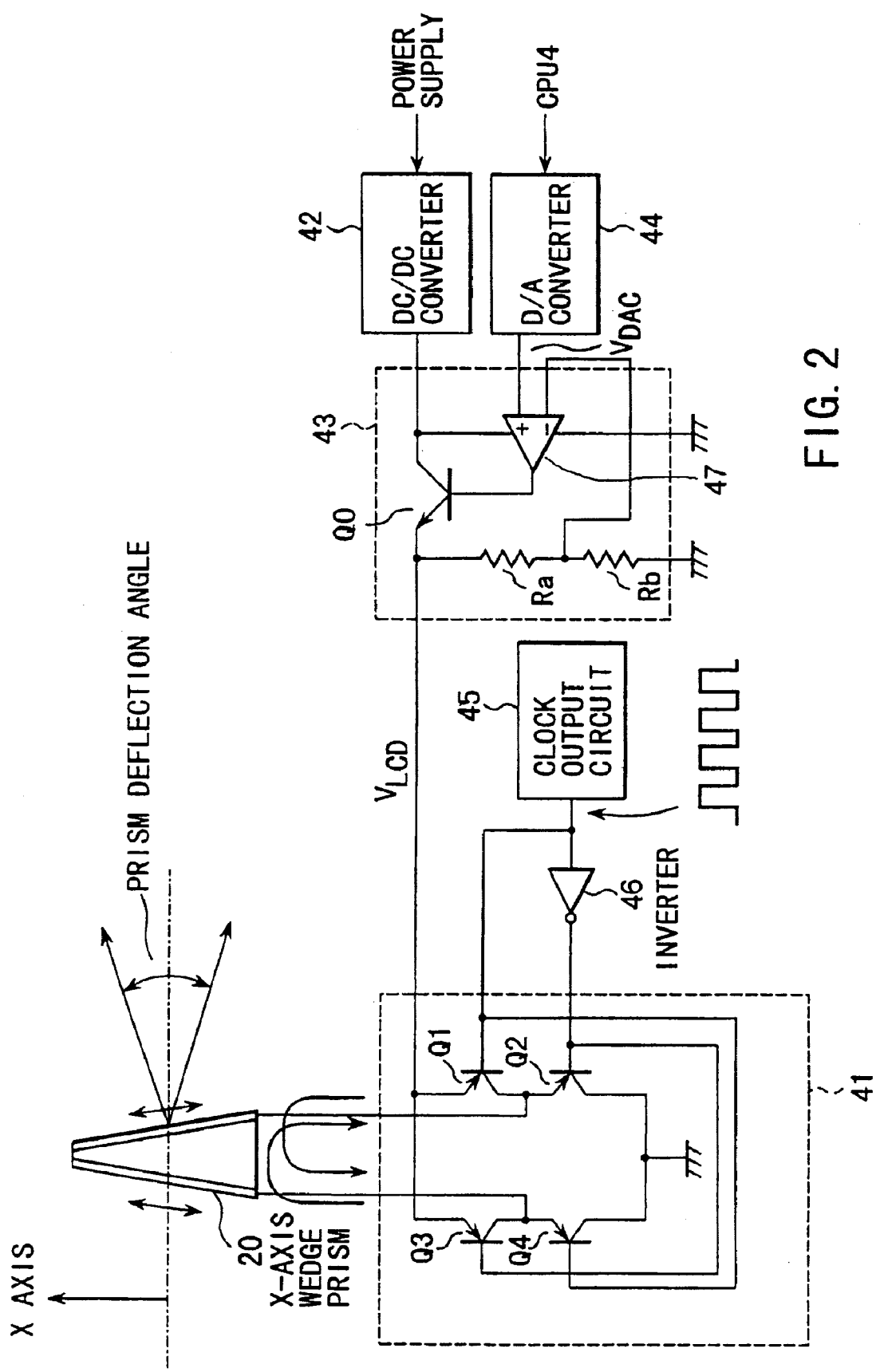
FIG. 2 is a diagram showing an example of the constructions of a wedge prism and a driving circuit therefor shown in FIG. 1.

FIG. 2 shows the constructions of the wedge prism 20 shown in FIG. 1 and the driving circuit 21 for driving the same. In this example, the X-axis wedge prism 20a and the X-axis wedge prism driving circuit 21a for driving the prism are explained as an example, but the same explanation can be applied to the Y-axis wedge prism 20b and Y-axis wedge prism driving circuit 21b.

The X-axis wedge prism driving circuit 21a includes a bridge circuit 41 having transistors Q1 to Q4 and connected to the electrodes of the X-axis wedge prism 20a to apply an AC voltage thereto, a DC/DC converter 42 for supplying a voltage from the power supply side of the camera to the bridge circuit 41, a voltage lowering circuit 43 for setting the output of the DC/DC converter 42 to a voltage value which is applied to the bridge circuit 41, a D/A converter 44 for freely setting a voltage used as a reference of the output voltage value of the voltage lowering circuit 43, and a clock output circuit 45 and inverter 46 for controlling the switching operation of the bridge circuit 41 to cause an AC voltage to be generated.

With the above construction, the power supply voltage of the camera is supplied to the DC/DC converter 42 and a voltage higher than the maximum voltage applied to the wedge prism 20 is output to the voltage lowering circuit 43. The voltage lowering circuit 43 includes a series circuit of resistors Ra, Rb, an operational amplifier 47 for outputting a difference between a voltage value obtained by the voltage dividing ratio of the resistors and a voltage value ($V_{DAC}$) from the D/A converter 44, and a transistor Q0 for lowering the voltage to a necessary driving voltage ($V_{LCD}$) according to the difference output and outputting the driving voltage.

The driving voltage $V_{LCD}$ can be freely set according to the output voltage $V_{DAC}$ of the D/A converter 44. The following equation (1) can hold between the voltages $V_{LCD}$ and $V_{DAC}$.

$$V_{LCD}=(Ra+Rb)/Rb \times V_{DAC} \qquad (1)$$

The bridge circuit 41 converts the voltage ($V_{LCD}$) to an AC voltage by alternately turning ON/OFF a pair of transistors Q3 and Q2 and a pair of transistors Q1 and Q4 by the action of the clock output circuit 45 and inverter 46 and supplies the AC voltage to the wedge prism 20.

Then, if information on the relation between the application voltage (setting value of the D/A converter) and the deflection angle caused by the wedge prism 20 is acquired, the CPU 4 can change the direction of the light beam passing through the prism by a desired angle.

The shake angle of the camera can be detected by integrating the shake amounts detected by the X-axis, Y-axis detecting gyros 22a, 22b. By deflecting the light beam passing through the X-axis, Y-axis wedge prisms 20a, 20b in a direction to cancel the shake angle, a subject image formed by the photographing lens stands still in its position as if it is fixed in the space.

This embodiment attains shake correction by deflecting the light beam in an opposite direction (in a canceling direction) by an angle corresponding to the shake angle by use of the wedge prism.

Figure 3A:
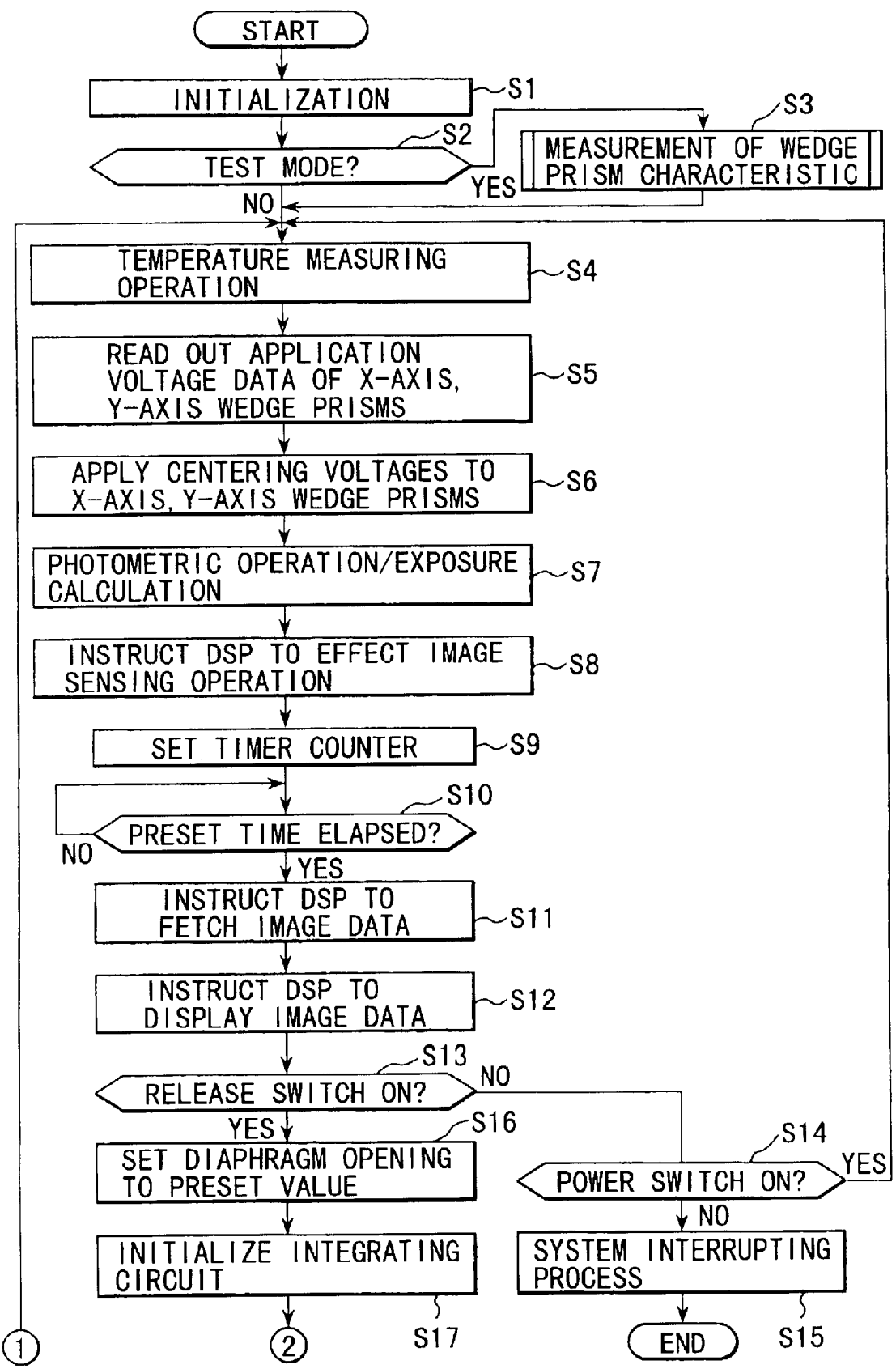
FIGS. 3A and 3B are flowcharts for illustrating the main operation of the camera in the first embodiment.
Figure 3B:
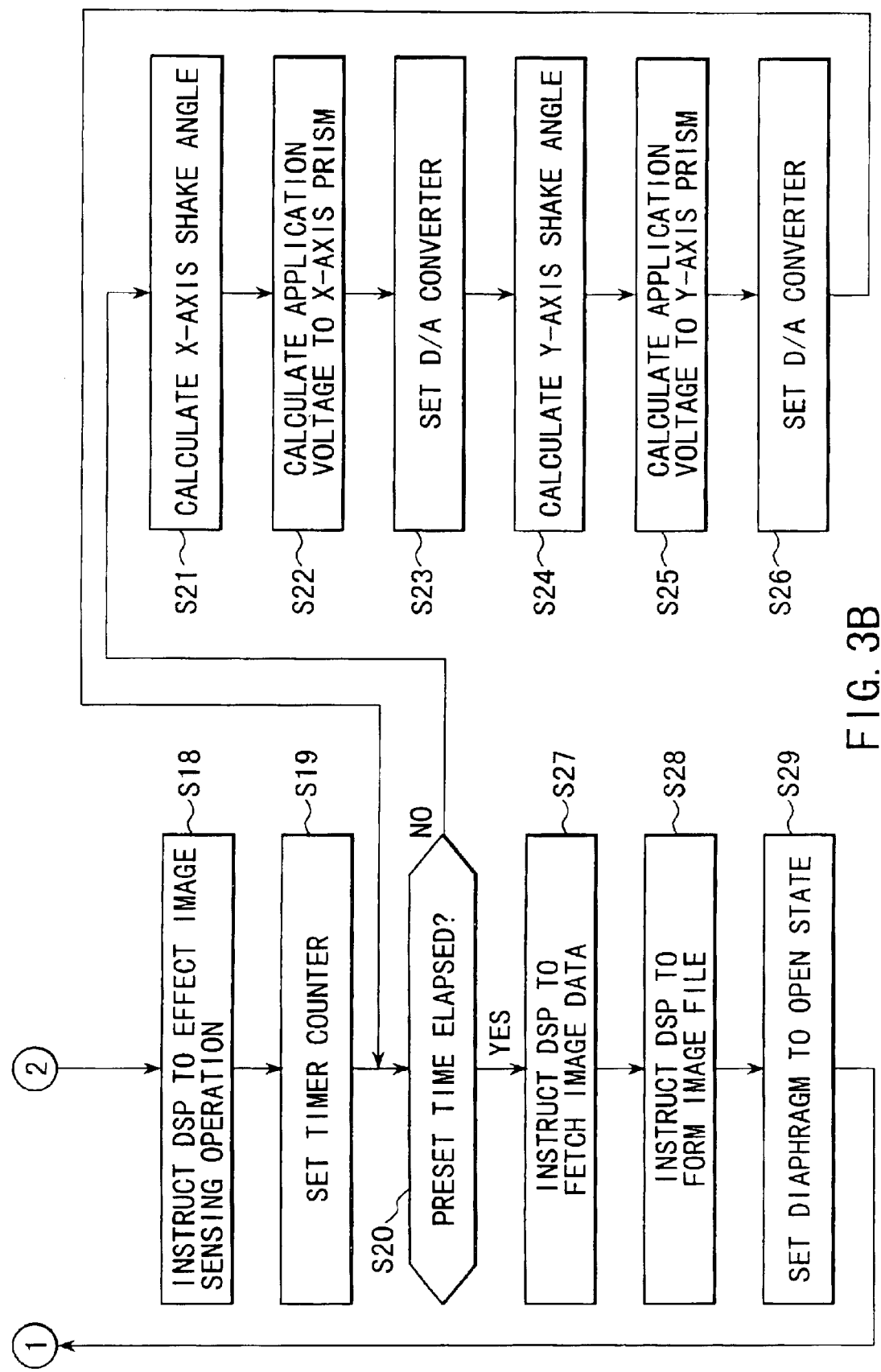

The main operation of the camera of this embodiment is explained with reference to the flowcharts shown in FIGS. 3A and 3B.

First, the power switch 5 is turned ON, the power supply voltage is supplied to the system of the camera and the CPU 4 starts the operation to effect the initialization process (step S1). In the initialization process, the I/O port, memory and circuits connected to the CPU 4 are initialized.

Then, whether or not the test terminal 37 is set in the test mode is determined (step S2). Specifically, when the test terminal 37 is set in the short-circuited state, the test mode is determined (YES) and the sub-routine "measurement of wedge prism characteristic" which will be described later is executed (step S3). If the test terminal 37 is not set in the test mode (NO), the normal operation mode is determined and the present temperature data of the camera measured by the temperature measuring circuit 7 is input (step S4).

Next:, voltage data indicating the voltage values to be applied to the x-axis, Y-axis wedge prisms 20a, 20b and stored in the EEPROM 19 are read out and input to the CPU 4 (step S5). In the EEPROM 19, a data table for selecting voltage data is stored.

For example, in the following table 1, the data table indicating necessary application voltages for controlling the X-axis wedge prism 20a is set.

TABLE 1

| X-axis light beam deflection angle \ Temperature | −10–0 (° C.) | 1–10 (° C.) | 11–30 (° C.) |
|---|---|---|---|
| +1.0 (Degree) | 3.5 (V) | 2.5 (V) | 1.5 (V) ~ ※1 |
| +0.8 | 4.0 | 3.0 | 2.0 |
| +0.6 | 4.5 | 3.5 | 2.5 |
| +0.4 | 5.0 | 4.0 | 3.0 |
| +0.2 | 5.5 | 4.5 | 3.5 |
| 0.0 | 6.0 | 5.0 | 4.0 ← ※2 |
| −0.2 | 6.5 | 5.5 | 4.5 |
| −0.4 | 7.0 | 6.0 | 5.0 |
| −0.6 | 7.5 | 6.5 | 5.5 |
| −0.8 | 8.0 | 7.0 | 6.0 |
| −1.0 | 8.5 | 7.5 | 6.5 |

It is necessary to change the data table according to the temperature change when taking the temperature characteristic of the portions constituting the wedge prism 20. In the example shown in the table 1, it is supposed that the temperature range in which the camera is used is divided into three regions.

For example, if the temperature measured in the step S4 is 20° C., the data table shown in ※1 is read out from the EEPROM 19. Likewise, the data table for the Y-axis wedge prism 20b is set in the EEPROM 19 and the data table corresponding to 20° C. is read out.

Next, in order to apply a centering voltage indicated in ※2 to the X-axis wedge prism 20a from the data table in the table 1, an output of the D/A converter 44 in the X-axis prism driving circuit 21a is set (step S6). Likewise, setting by the centering voltage is made for the Y-axis wedge prism 20b.

Generally, in a system for correcting shake by shifting or tilting part of the lens group of the photographing optical system, the lens group is moved to a neutral position (the center of the shifting or tilting range) prior to the shake correcting operation. The operation is called a centering operation.

In a case wherein the shake correcting operation is effected by use of the wedge prism 20 as in this embodiment, an operation corresponding to the centering operation as shown in the step S6 is necessary. By applying the centering voltage, the light beam passing through the wedge prism will pass therethrough without being deflected. If a voltage lower than the centering voltage is applied, the light beams is deflected in the positive direction (+ direction). Further, if a voltage higher than the centering voltage is applied, the light beams is deflected in the negative direction (− direction).

The operations of the temperature measurement, the voltage readout of the wedge prism and the application of the centering voltage in the steps S4 to S6 are periodically effected. Therefore, the data table corresponding to the temperature change is adequately read out from the EEPROM 19 even if the temperature of the camera is changed and an adequate voltage is applied to the wedge prism 20.

Then, luminance data of the subject is input from the photometry circuit 8 and the exposure, that is, the shutter period (integration time of the image sensing device) and the opening of the diaphragm 14 are calculated (step S7). After the shutter period and the opening of the diaphragm are set, the CPU 4 issues an instruction to the DSP 36 so as to start the integrating operation of the image sensing device 27 (step S8).

Next, after preset time is set in a timer counter, the operation thereof is started (step S9) and it waits until the preset time set in the timer counter elapses (step S10).

If the preset time has elapsed (YES), the CPU 4 issues an instruction to the DSP 36 to fetch image data. In response to the instruction, the DSP 36 interrupts the integrating operation of the image sensing device 27, fetches the image data and stores the image data into the DRAM 32 (step S11). After this, the DSP 36 is instructed to display the image data and causes the liquid crystal monitor 30 to display the fetched image data.

Next, whether the release switch 6 is set in the OFF state or not is determined (step S13) and if it is set in the OFF state, the ON/OFF state of the power switch 5 is detected (step S14). If the power switch 5 is set in the ON state, the process returns to the step S4 and the CPU 4 continues the operation. However, if it is set in the OFF state, the system interruption process is effected (step S15) and the operation of the CPU 4 is interrupted.

If it is detected in the step S13 that the release switch 6 is set in the ON state, the diaphragm is set to a diaphragm-opening determined in the step S7 by the diaphragm driving mechanism 15 (step S16) and the X-axis, Y-axis integrating circuits 23a, 23b are initialized (step S17). The deflection angle can be detected by integrating the outputs of the X-axis, Y-axis detecting gyros 22a, 22b. Therefore, at the starting time of the shake correcting operation, the X-axis, Y-axis integrating circuits 23a, 23b are initialized by use of the reset circuit 26 to reset the output values thereof to a reference value.

Next, the CPU 4 instructs the DSP 36 to start the integrating operation of the image sensing device 27 (step S18). In response to the instruction, the DSP 36 starts the time counting operation of the timer counter for measuring the shutter period set in the step S7 (step S19). Then, whether the counting time of the timer counter reaches the set shutter period or not is determined (step S20).

As the result of the above determination, if it is detected that the set shutter period is not reached (NO), the CPU 4 causes the analog multiplexer 24 to select the output of the X-axis integrating circuit 23a, the output is converted to a digital signal by the A/D converter 25 and then shake in the X direction (camera deflection angle) is calculated in the CPU 4 (step S21).

A voltage applied to the X-axis wedge prism 20a is derived based on the calculated camera deflection angle and table data read out from the EEPROM 19 (step S22). For example, if the camera deflection angle is −0.4 degree, the light beam may be deflected by +0.4 degree by use of the X-axis wedge prism 20a. In this case, as a voltage applied to the X-axis wedge prism 20a, a voltage of 3.0 V is selected from ※1 in the table 1. The D/A converter 44 of the X-axis wedge prism driving circuit 23a is set so as to apply the application voltage to the X-axis wedge prism 20a (step S23).

Further, if the camera deflection angle is set to an angle such as −0.45 degree which does not exist on the table, an intermediate value may be derived based on application voltage data items for +0.4 degree and +0.6 degree.

Likewise, in the case of shake in the Y-axis direction, a voltage applied to the Y-axis wedge prism 20b is derived based on the camera deflection angle and the D/A converter 44 of the Y-axis wedge prism driving circuit 23b is set (steps S24 to S26). After the setting, the process returns to the step S20. Since the process of the steps S21 to S26 is repeatedly effected at high speed during the integrating operation of the image sensing device 27, a subject image on the image sensing device 27 is fixed irrespective of shake occurring in the camera.

If it is detected in the step S20 that the preset shutter period has elapsed (YES), the CPU 4 issues an instruction to the DSP 36 to fetch image data (step S27). In response to the instruction, the DSP 36 interrupts the integrating operation of the image sensing device 27, reads out image data from the image sensing device 27 and stores the readout data into the DRAM 32.

Next, the CPU 4 issues an instruction to the DSP 36 to form an image file (step S28). The DSP 36 converts fetched image data into a preset format to form an image file and stores the same into the image data recording media 35.

After the storage process is completed, the diaphragm 14 is driven to an open state (step S29), the process returns to the step S4 and the same process is repeatedly effected.

Next, the sub-routine "measurement of wedge prism characteristic" of the step S3 shown in FIG. 3 is explained.

Figure 4:
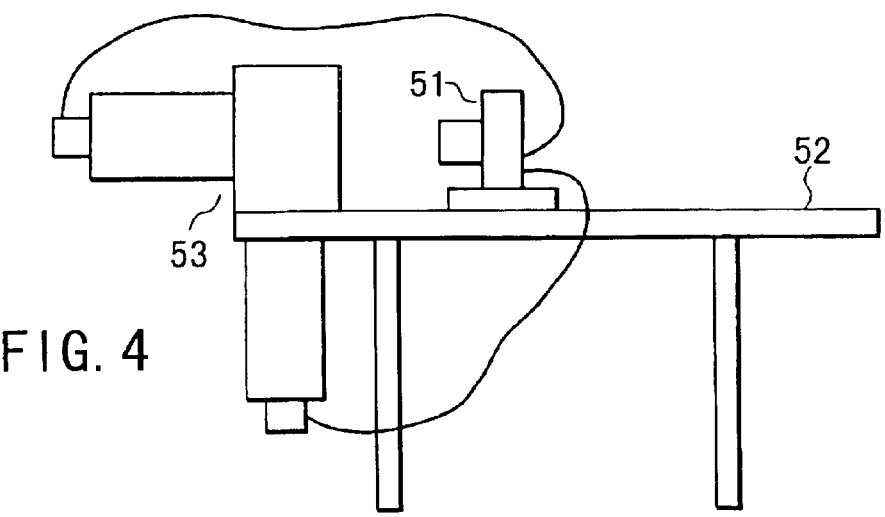
FIG. 4 is a view showing an example of the structure for measurement of the wedge prism characteristic in the first embodiment.

When the sub-routine is executed, as shown in FIG. 4, a camera 51 is mounted on a bench 52 to face a reference light source unit 53 which is necessary for measuring the characteristic of the wedge prism 20.

Figure 5:
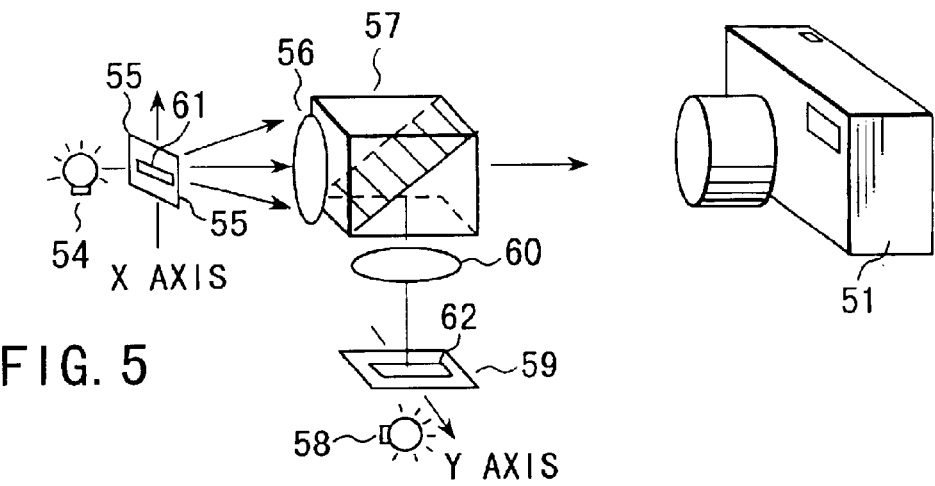
FIG. 5 is a conceptual view of a reference light source unit shown in FIG. 4.

The conceptual construction of the reference light source unit 53 is shown in FIG. 5.

An X-axis measuring light source 54, slit plate 55, collimator lens 56, beam splitter 57 and camera 51 are arranged on the optical axis of the photographing lens of the camera. Likewise, in the Y-axis direction perpendicular to the X-axis direction on the optical axis which is branched by the beam splitter 57, a Y-axis measuring light source 58, slit plate 59 and collimator lens 60 are arranged.

A slit 61 which is perpendicular to the X axis is formed in the slit plate 55 disposed near the X-axis measuring light source 54 in the X-axis direction at the time of measurement by use of the reference light source unit 53 thus constructed, a light beam passing through the slit 61 is converted to parallel light by the collimator lens 56 and is made incident on the beam splitter 57. The light beam passing through the beam splitter 57 is made incident on photographing lens of the camera 51.

In the Y-axis direction, a slit 62 which is perpendicular to the Y axis is formed in the slit plate 59 disposed near the Y-axis measuring light source 5B. A light beam passing through the slit 62 is converted to parallel light by the collimator lens 60 and is made incident on the beam splitter 57. The incident light beam is bent by 90 degrees by a half mirror in the beam splitter 57 so as to be directed towards the photographing lens and is made incident on the photographing lens of the camera 51.

The X-axis measuring light source 54 is controlled to be turned ON/OFF based on an output of the X-axis timing signal output terminal 38. Likewise, the Y-axis measuring light source 58 is controlled to be turned ON/OFF based on an output of the Y-axis timing signal output terminal 39.

Figure 6:
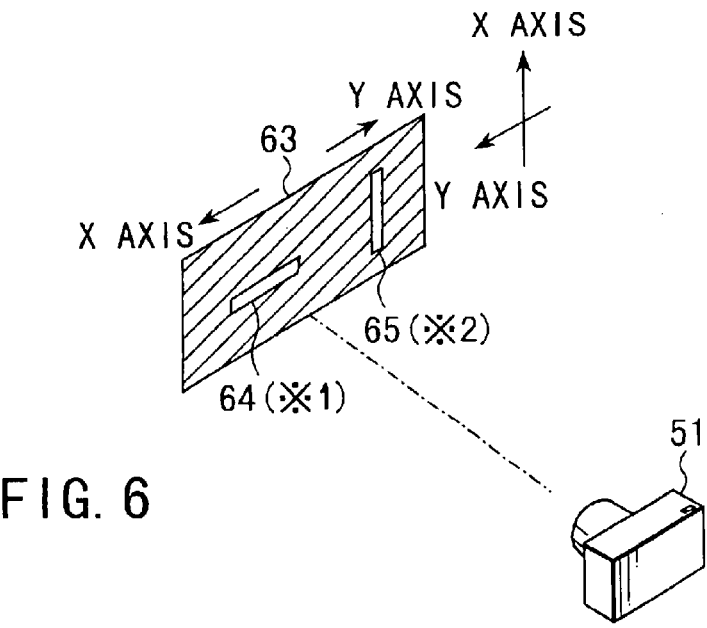
FIG. 6 is a view showing the structure using a chart for measurement of the wedge prism characteristic in the first embodiment.

Further, as a method which does not use the reference light source unit, a method using a chart 63 shown in FIG. 6 can be considered. The black chart 63 is disposed at a distance which is set within a focus adjustable range of the camera 51. Then, the chart 63 is so positioned that a white slit mark 64 formed in the horizontal direction on the chart 63 will be set at the center of the photographing area when a control signal is output from the X-axis timing signal output terminal 38.

On the other hand, when a control signal is output from the Y-axis timing signal output terminal 39, the chart 63 is so positioned that a white slit mark 65 formed in the vertical direction on the chart 63 will be set at the center of the photographing area of the camera.

If the measurement is made by the method using the above chart, the same result of measurement as in a case using the reference light source unit can be obtained.

Figure 7A:
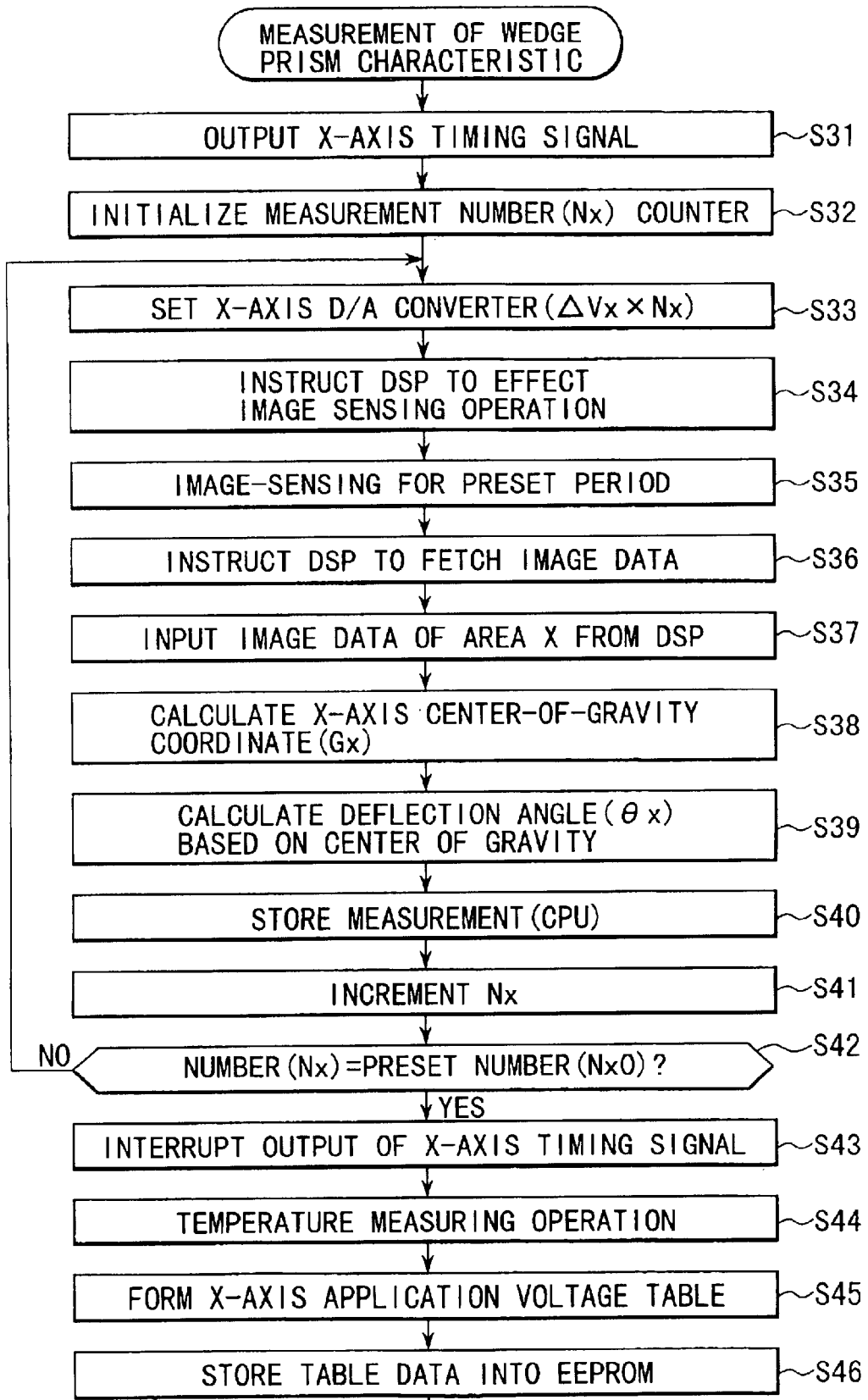
FIGS. 7A and 7B are flowcharts for illustrating the sub-routine of measurement of the wedge prism characteristic in the first embodiment.
Figure 7B:
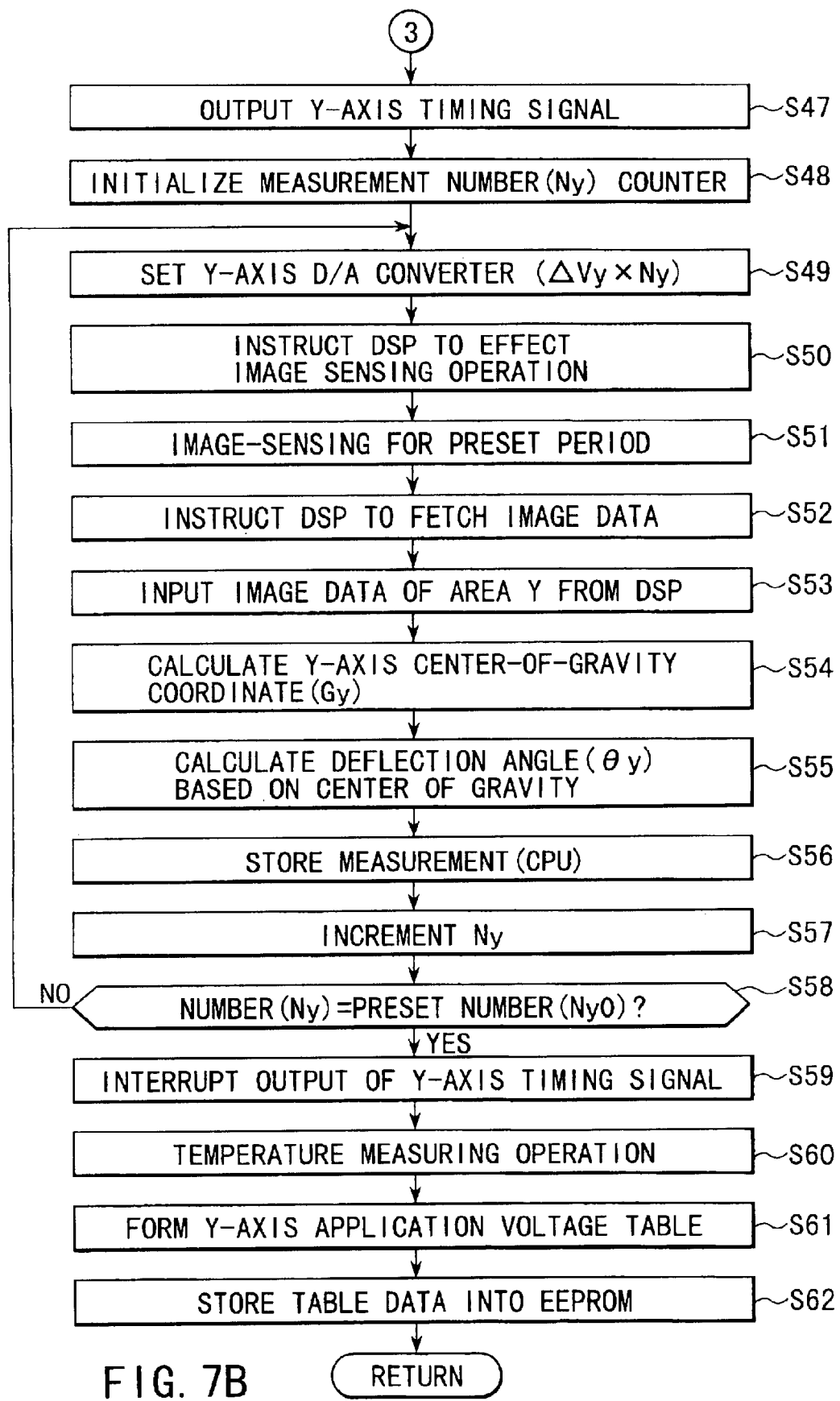

Next, the sub-routine "measurement of wedge prism characteristic" is explained with reference to the flowcharts shown in FIGS. 7A and 7B.

In the step 52 of FIG. 3, if it is detected that the test terminal 37 is short-circuited, the sub-routine "measurement of wedge prism characteristic" is executed.

First, after a timing signal is output from the X-axis timing signal output terminal 38 and the X-axis measuring light source 54 of the reference light source unit 53 is turned ON (step S31), the count of the measurement number counter (Nx) is cleared ("0") (step S32).

Then, in order to apply a voltage determined by multiplying a value (Nx) of the counter by a measurement voltage (ΔVx) to the X-axis wedge prism 20a, the output of the D/A converter 44 of the X-axis wedge prism driving circuit 21a is set (step S33).

The CPU 4 issues an instruction to the DSP 36 to start the integrating operation of the image sensing device 27 (step S34). In response to the instruction, the DSP 36 starts the integrating operation of the image sensing device 27. Then, the image-sensing operation is continued for a preset period of time (step S35). The preset period of time is determined by the brightness of light which is made incident on the camera 51 from the reference light source unit 53.

Next, the CPU 4 issues an instruction to the DSP 36 to fetch image data (step S36). The DSP 36 interrupts the integrating operation of the image sensing device 27, fetches image data, and stores the same into the DRAM 32. The CPU 4 receives only pixel data of an area X necessary for the measurement operation among the image data stored in the DRAM 32 from the DSP 36 (step S37).

Figure 8:
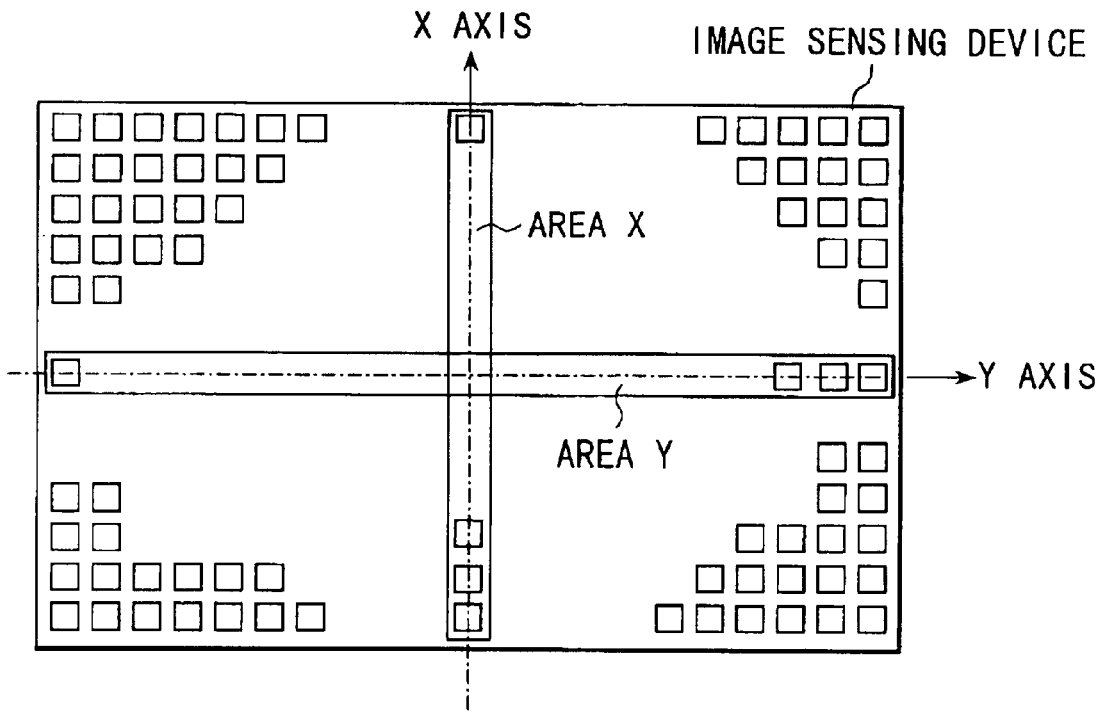
FIG. 8 is a view showing pixel data positions in an area X necessary for measurement of the wedge prism characteristic in the first embodiment.

The position of the pixel data of the area X is shown in FIG. 8. X and Y axes are set on the image sensing device 27 for convenience and it is supposed that an area along the X axis is set as the area X. Likewise, an area Y is defined in the same manner. Pixel data in the area Y is used when the characteristic of the Y-axis wedge prism 20b is measured.

Figures 9A, 9B:
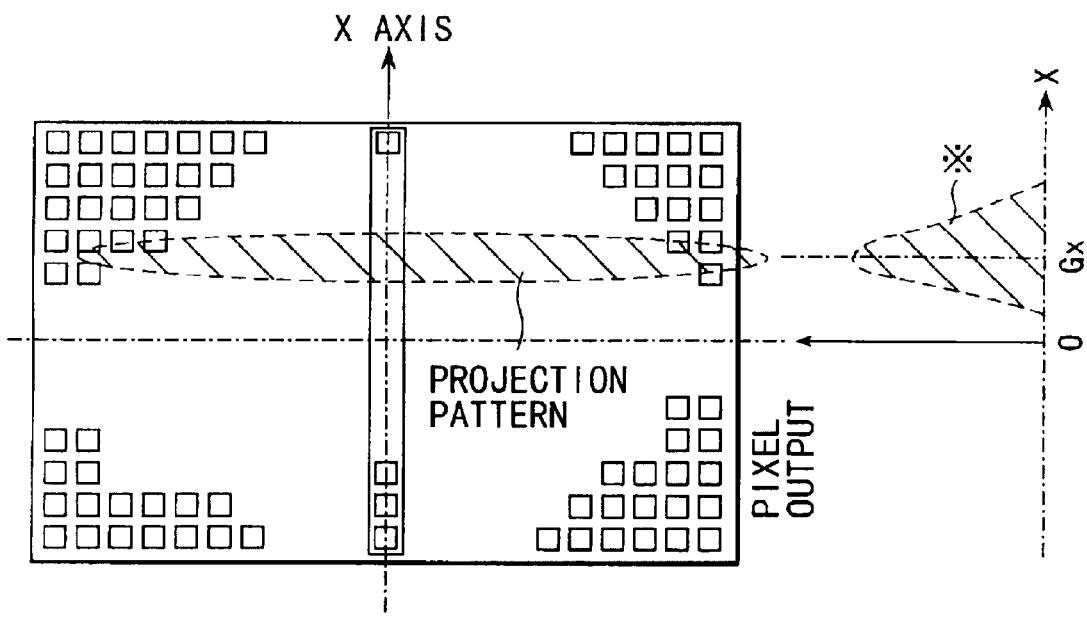
FIG. 9A shows one example of a projection pattern for forming an image on the image sensing device at the turn-ON time of an X-axis measurement light source.
FIG. 9B shows a state obtained by plotting image data of the area X.

As shown in FIG. 9A, a projection pattern passing through the slit is formed on the image sensing device when the X-axis measuring light source is lit. FIG. 9B shows the state in which image data of the area X is plotted.

The center of gravity (Gx) of a portion indicated by a mark ※ in FIG. 9B on the X axis is calculated (step S38) and a deflection angle (θx) of the light beam by the X-axis wedge prism can be derived by multiplying the center of gravity Gx by a preset coefficient (step S39).

They are temporarily stored into a memory in the CPU 4 with the deflection angle (θx) of the light beam set to correspond to the application voltage (ΔVx·Nx).

Then, the count of the measurement number counter (Nx) is incremented (+1) (step S41) and whether or not the count reaches a preset number (Nxo) is determined (step S42). If the result of the above determination indicates that the count does not reach the preset number Nxo (NO), the step S33 is effected and the measuring operation is continued. If the count reaches the preset number (YES), the output of the X-axis timing signal is interrupted (step S43) and the X-axis measuring light source 54 is turned OFF.

Next, temperature data of the camera is input from the temperature measuring circuit 7 to the CPU 4 (step S44).

By the process of the steps S33 to S42, a data table as shown in the table 2 is formed in the memory in the CPU 4 (step S45). The data table indicates the relation between the voltage and the deflection angle of the light beam with the application voltage used as a variable. However, in the EEPROM 19, the relation between the deflection angle and the application voltage is stored as shown in the table 1 with the deflection angle of the light beam used as a variable.

TABLE 2

| Application voltage ΔVx · Nx | Deflection angle θx |
|---|---|
| 1.0(V) | +1.2 |
| 2.0 | +0.8 |
| 3.0 | +0.4 |
| 4.0 | 0.0 |
| 5.0 | −0.4 |
| 6.0 | −0.8 |
| 7.0 | −1.2 |
| 8.0 | −1.4 |

The data table of configuration shown in the table 1 is derived based on the data table of the table 2. For example, if the temperature indicates 20 degrees, it indicates that the data table corresponding to a portion indicated by ※1 in the table 1 is derived. Derived data is stored into an address of the EEPROM 19 corresponding to ※1 in the table 1.

In order to precisely derive the data table, a variation amount (ΔVx) of the application voltage is set smaller and the measurement number (Nxo) is set larger. The optimum values of the variation amount ΔVx, the preset number Nxo of the measurement number counter are determined by the characteristic of a material constituting the wedge prism 20 and the required precision of the anti-vibration characteristic.

Therefore, it is desirable to adequately change them rather than to set them to previously determined fixed values. If parameters stored into the EEPROM 19 are used as the variation amount ΔVx and the preset number Nxo, they can be adequately changed as required and it is convenient.

In order to form the data table shown in the table 1, it is necessary to make three measurements while changing the temperature. If the characteristic of the material constituting the wedge prism changes in a complicated manner with a change in the temperature, it is necessary to increase the number of data tables. If a change in the characteristic with the temperature change monotonically increases or decreases, the table can be formed by use of data measured at a representative temperature. For example, only a data table for the temperature of 20 degrees is formed and stored into the EEPROM. Then, the value of the data table is corrected and used based on a difference between the temperature of the camera and 20 degrees when the shake correcting operation is effected.

When the measurement of the X-axis wedge prism 20a is completed, the characteristic measuring operation of the Y-axis wedge prism 20b is effected.

After this, in the characteristic measurement of the Y-axis wedge prism 20b effected in the steps S47 to S62, the Y-axis measuring light source 58 is turned ON, the same operations and calculation processes as those in the measurement of the X-axis wedge prism 20a are effected, and a data table formed is stored into the EEPROM 19. Thus, since it is clearly understood from the flowchart that the measuring operation is the same as the measuring operation in the X-axis wedge prism, the explanation therefor is omitted.

In the above embodiment, the calculation process is effected on the camera side, but it is possible to output image data to the external control device (PC) 33 via the communication interface circuit 34 and effect the data table forming process on the PC 33 side. This is an effective method for reducing the number of manufacturing steps, for example, in a case where the operation for forming the data table is a heavy load and it takes a long time to effect the calculation process for the CPU 4 of the camera.

Figure 10:
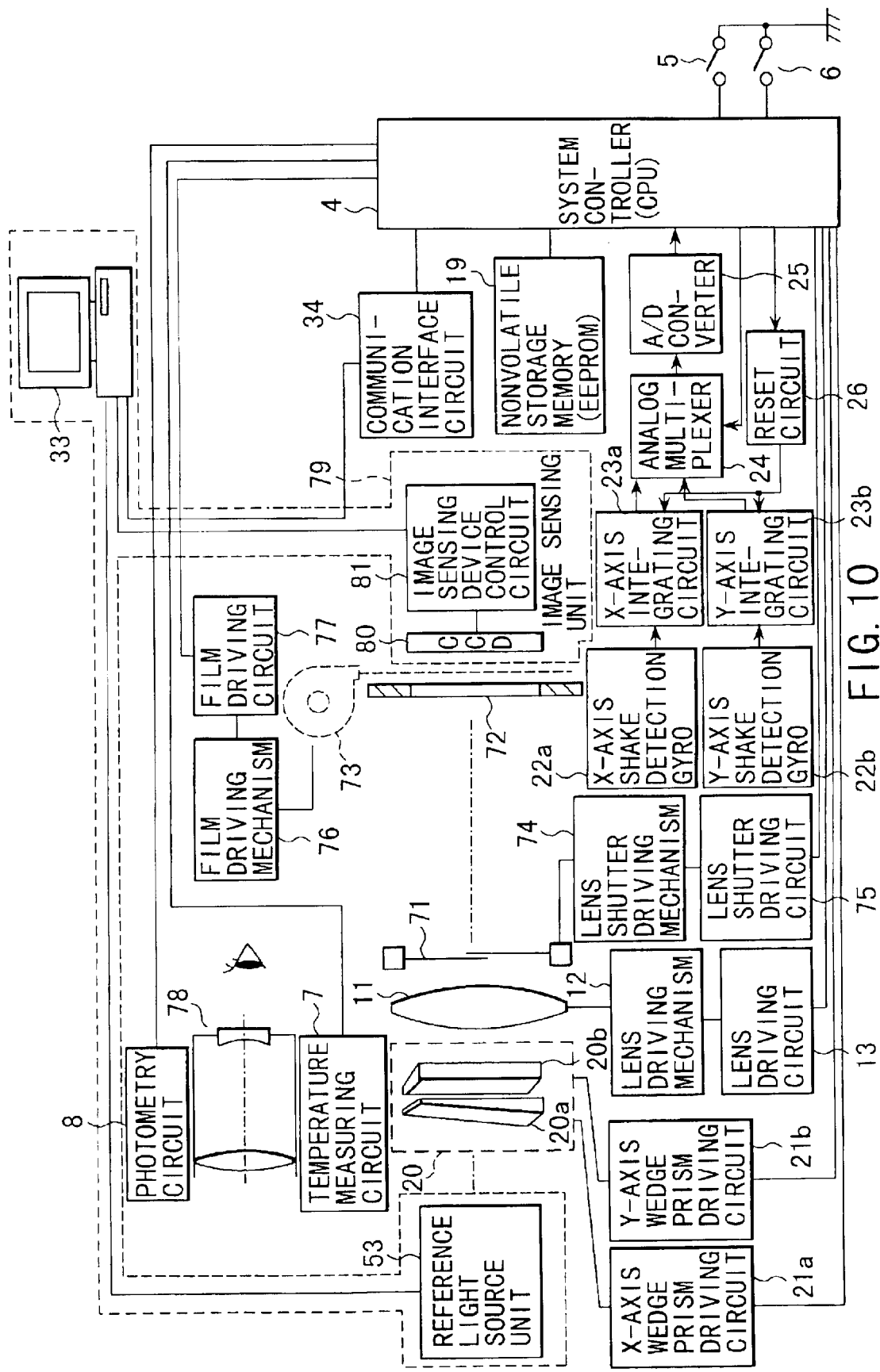
FIG. 10 is a diagram showing an example of the schematic construction of a silver halide film camera containing a shake correction device according to a second embodiment of this invention.

FIG. 10 shows an example of the schematic construction of a silver halide film camera containing a shake correction device according to a second embodiment of this invention.

Portions shown in FIG. 10 which are the same as those of the first embodiment shown in FIG. 1 are denoted by the same reference numerals and the explanation therefor is omitted.

The camera of this embodiment includes an optical finder 78 and a photographing lens 11, lens shutter 71 and aperture 72 are disposed behind a wedge prism 20. A film 73 is loaded into the camera via the aperture 72.

The lens shutter 71 is used instead of the diaphragm 14 of the first embodiment and a sector provided on the lens shutter 71 is driven by a lens shutter driving mechanism 74 having an actuator. Power required for driving the actuator is supplied from a lens shutter driving circuit 75 controlled by a CPU 4. Therefore, the lens shutter driving circuit 75 can be controlled by the CPU 4 so that the film 73 can be exposed for a time.

Further, feeding of the film 73 is effected by a film driving mechanism 76 having an actuator such as a motor and the film driving mechanism 76 is supplied with a driving power supply voltage from a film driving circuit 77 controlled by the CPU 4 so as to wind up or rewind the film 73 as required.

An image sensing unit 79 surrounded by broken lines shown in FIG. 10 is mounted on the camera instead of the film 73 only at the time of characteristic. measurement of the wedge prism 20.

This is because the camera of this embodiment does not have an image sensing device and the characteristic measurement cannot be made by using the image sensing device as in the first embodiment, and therefore, the image sensing unit 79 is mounted instead of the film 73 at the time of measurement. The image sensing unit 79 includes an image sensing device 80 formed of a CCD and an image sensing device controlling circuit 81 which is controlled by an external control device 33 such as a personal computer, for driving the image sensing device 80. Further, at the time of characteristic measurement, a reference light source unit 53 which is the same as that described before is used.

With the above construction, the image sensing device 80 of the image sensing unit 79 is controlled based on an instruction from the external control device 33 and the CPU 4 is operated based on an instruction supplied from the external control device 33 via a communication interface 34 during the measurement operation.

The main operation of the camera of the second embodiment is explained with reference to the flowcharts shown in FIGS. 11A and 11B.

First, if the power switch 5 is turned ON, the power supply voltage is supplied to the system of the camera and the CPU 4 starts the operation to effect the initialization process for the I/O port, memory and other circuits (step S71).

Then, whether or not a communication request from the external control device 33 is present or not is determined based on an output of the communication interface circuit 34 (step S72). If the result of the above determination indicates that there is no communication request (NO), a normal operation mode is determined and present temperature data of the camera measured by the temperature measuring circuit 7 is input (step S73).

Then, the same process as that of the steps S5 to S7 is effected, and voltage data is read out from the data table of the EEPROM 19 and input to the CPU 4 (step S74). In order to apply the centering voltages from the data table of the table 1 to the X-axis, Y-axis wedge prisms 20*a*, 20*b*, outputs of D/A converters 44 of X-axis, Y-axis prism driving circuits 21*a*, 21*b* are set (step S75). The centering operation is effected based on the temperature data and voltage data of the camera. The operations of the temperature measurement, the voltage readout of the wedge prism and the application of the centering voltage are periodically effected.

Then, luminance data of the subject is input from a photometry circuit 8 and the exposure, that is, the shutter period is calculated (step S76).

Next, whether the release switch 6 is set in the OFF state or not is determined (step S77) and if it is set in the OFF state, the ON/OFF state of the power switch 5 is detected (step S78). If the power switch 5 is set in the ON state, the process returns to the step S73 and the CPU 4 continues the operation. However, if it is set in the OFF state, the system interruption process is effected (step S79) and the operation of the CPU 4 is interrupted.

If it is detected in the step S77 that the release switch 6 is set in the ON state, the X-axis, Y-axis integrating circuits 23*a*, 23*b* are initialized (step S80).

Next, the lens shutter 71 is opened (step S81) to start the exposing operation and start the counting operation of the timer counter for counting the shutter period set in the step S7 (step S82).

Then, whether or not the count time of the timer counter reaches the set shutter period is determined (step S83).

If the result of the above determination indicates that it does not reach the shutter period (NO), the same shake correcting process as the process of the steps S21 to S26 shown in FIG. 3 is effected.

First, a shake amount in the X-axis direction (camera deflection angle) is measured (step S86). A voltage applied to the X-axis wedge prism 20*a* is derived (step S87) based on the derived camera deflection angle and table data. The D/A converter 44 of the X-axis wedge prism driving circuit 23*a* is set so as to apply the application voltage to the X-axis wedge prism 20*a* (step S88).

Likewise, in the case of shake in the Y-axis direction, the deflection angle of the camera is derived and a voltage applied to the Y-axis wedge prism 20*b* is derived to set the D/A converter 44 of the Y-axis wedge prism driving circuit 23*b* (steps S89 to S91).

After the setting, the process returns to the step S83. During the exposing operation, the shake correction operation of the steps S86 to S91 is repeatedly effected at high speed and the subject image formed on the film is fixed irrespective of the shake.

Then, in the step S83, after a preset shutter period has elapsed (YES), the lens shutter 71 is closed (step S84), the film 73 is wound up by one frame (step S85), the process returns to the step S73 and the same process is repeatedly effected.

If it is detected in the step S72 that a communication request is issued from the external control device 33 which will be described later (YES), the lens shutter 71 is opened (step S92) and the sub-routine "external control model" is executed (step 593). After the operation of the sub-routine is completed, the lens shutter 71 is closed (S94).

In the above operation, since it is necessary to apply light required for measurement to the camera from the reference light source unit 53 to measure the characteristic of the wedge prism 20, the lens shutter 71 which is normally closed for light shielding is set into the open state. For this purpose, the lens shutter 71 is opened in the step S92, and after the measurement by the external control mode is terminated, the lens shutter 71 is closed.

Figure 11A:
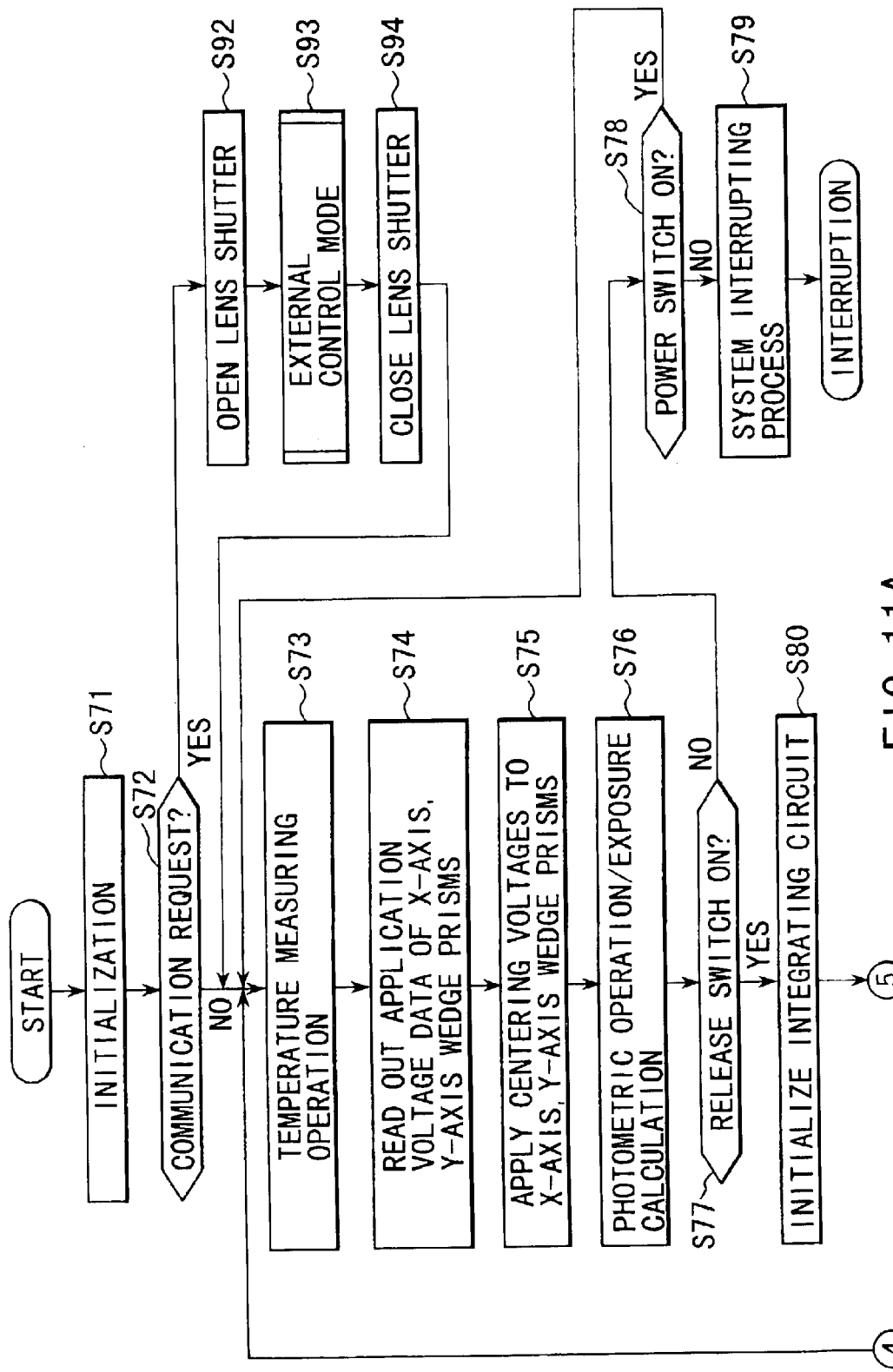
FIGS. 11A and 11B are flowcharts for illustrating the main operation of the camera in the second embodiment.
Figure 11B:
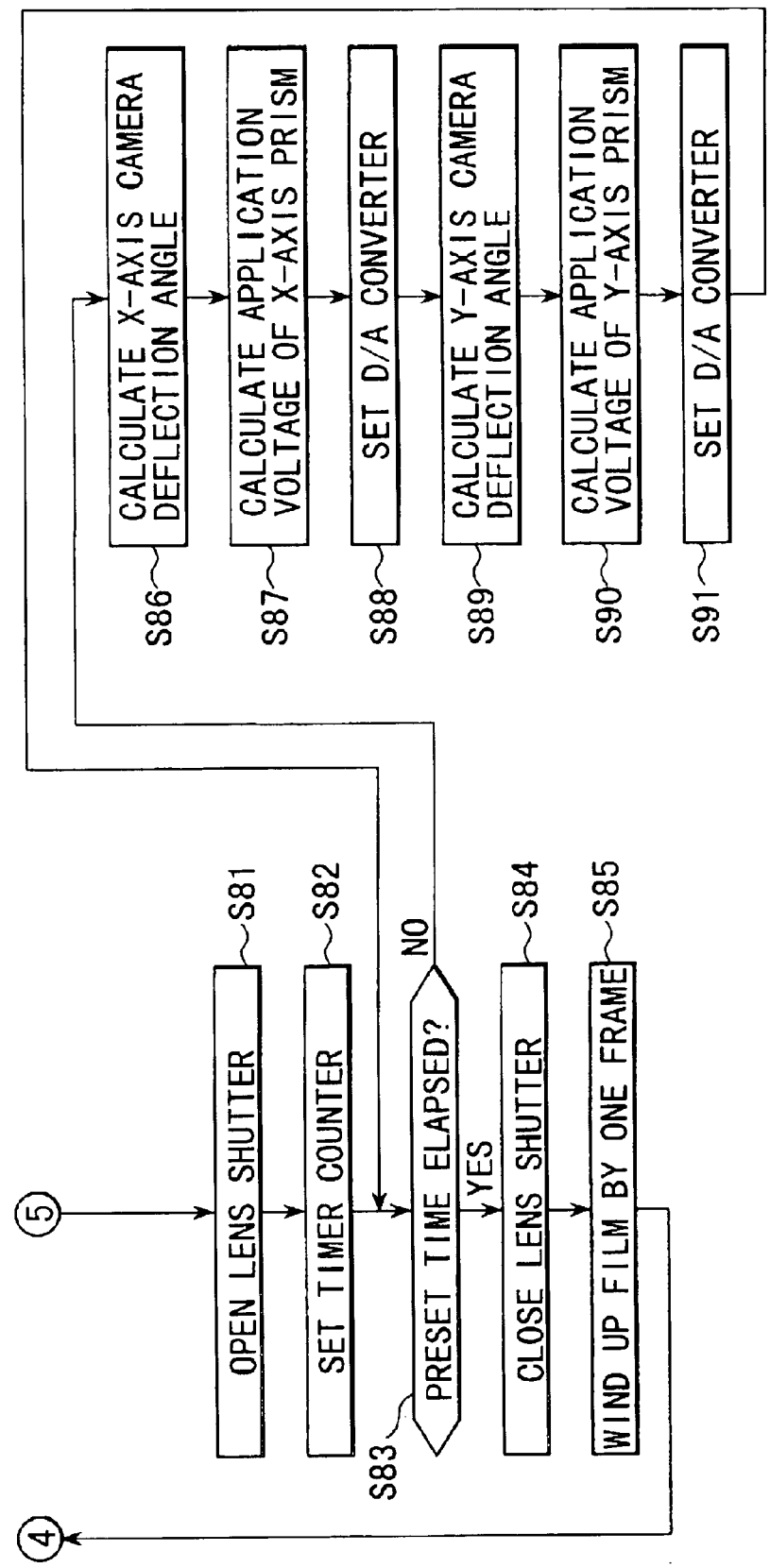
Figure 12:
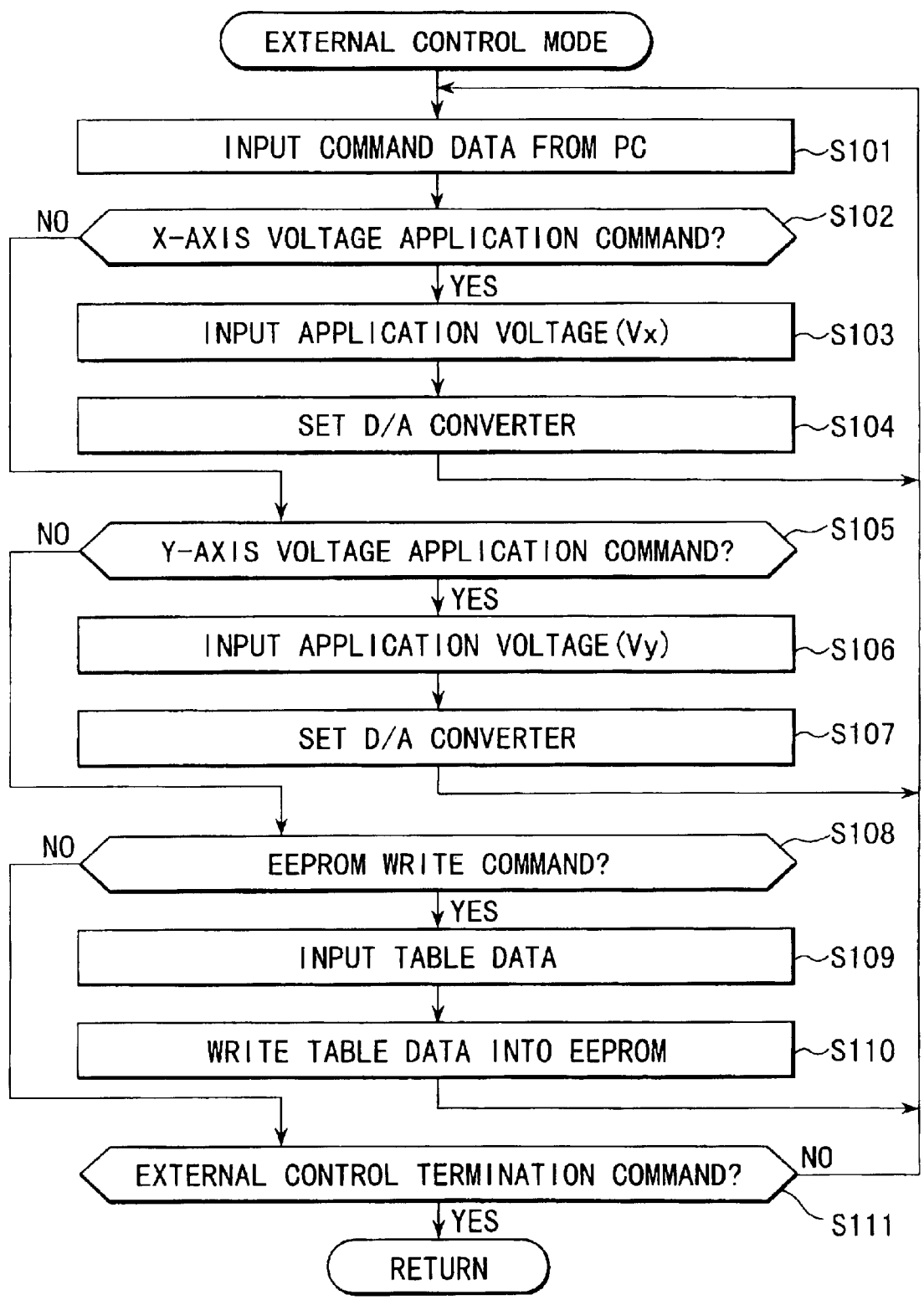
FIG. 12 is a flowchart for illustrating an external control mode shown in FIGS. 11A and 11B.

The external control mode shown in the step S93 of FIG. 11A is explained with reference to the flowchart shown in FIG. 12.

First, command data is input from the external control device 33 via the communication interface circuit 34 (step S101). Whether the command data indicates application of a voltage to the X-axis wedge prism 20a or not is determined (step S102).

If the result of the above determination indicates the voltage application (YES), voltage data (Vx) indicating an application voltage is input from the external control device 33 (step S103). The voltage data Vx is set in the D/A converter 44 of the X-axis wedge prism driving circuit 21a. Then, in order to receive a next command, the process returns to the step S101 and the process for the next input command is effected.

If it is detected in the step S102 that the input command data does not indicate the voltage application to the X-axis wedge prism 20a (NO), whether the command data indicates application of a voltage to the Y-axis wedge prism 20b or not is determined (step S105).

If the result of the above determination indicates the voltage application to the Y-axis wedge prism 20b (YES), voltage data (Vy) indicating an application voltage is input from the external control device 33 (step S106).

The voltage data Vy is set in the D/A converter 44 of the Y-axis wedge prism driving circuit 21b (step S107), and then, the process returns to the step S101.

If it is detected in the step S105 that the input command data does not indicate the voltage application to the Y-axis wedge prism 20b (NO), whether the command data indicates storage of data into the EEPROM 19 or not is determined (step S108). If the result of the above determination indicates storage of data into the EEPROM 19 (YES), the CPU 4 fetches table data from the external control device 33 via the communication interface circuit 34 (step S109). Further, the table data is stored into the EEPROM 19 (step S110).

Then, in order to receive a next command, the process returns to the step S101 and the process for the next input command is effected.

If it is detected in the step S108 that the input command data does not indicate storage of data into the EEPROM 19 (NO), whether the command data indicates termination of the external control or not is determined (step S111). If the result of the above determination indicates termination of the external control (YES), the process returns to the main routine to terminate the sub-routine. If the command data does not indicate termination of the external control (NO), the process returns to the step S101 to receive next command data.

Figure 13A:
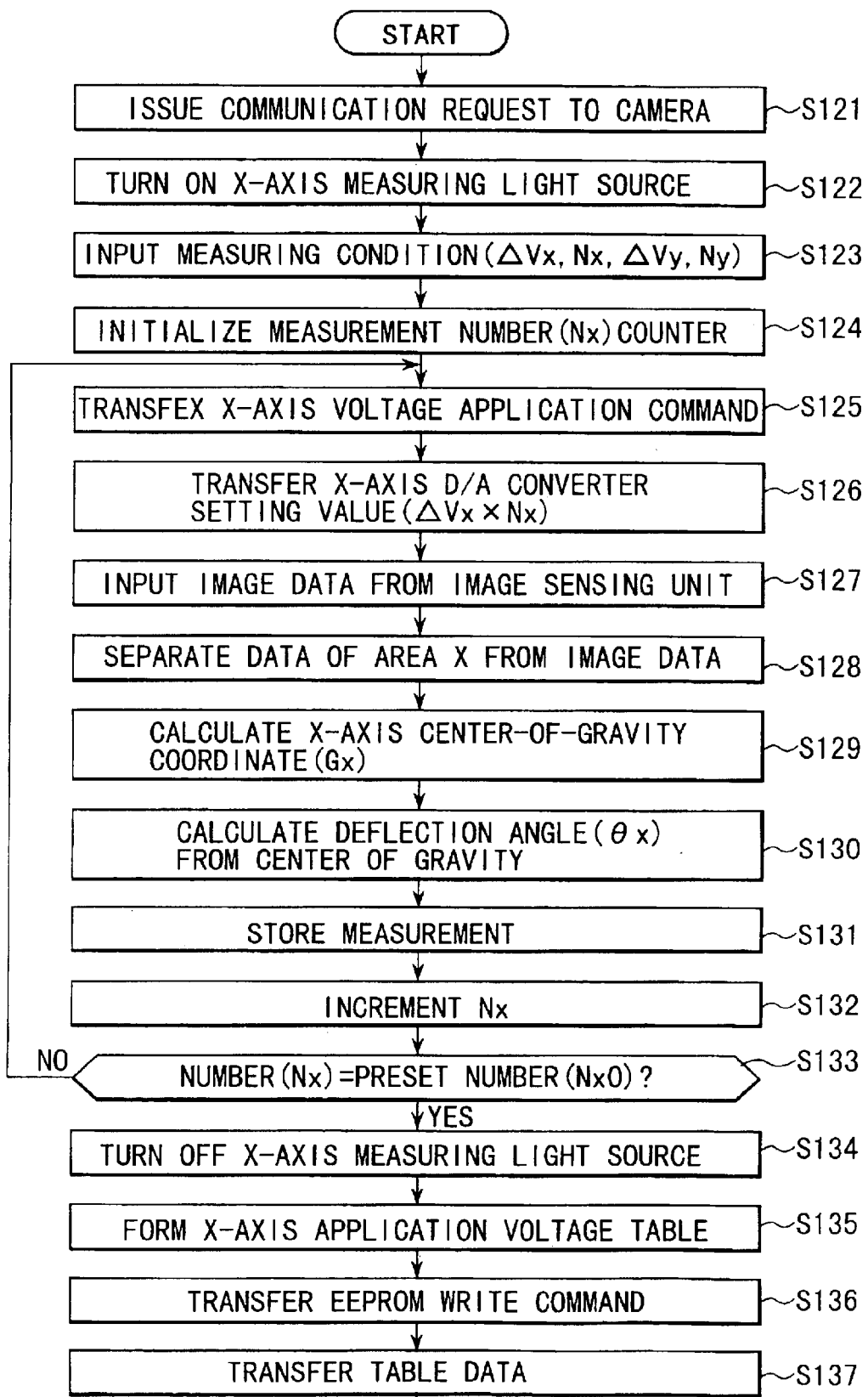
FIGS. 13A and 13B are flowcharts for illustrating a process for forming a data table necessary for control by measuring the prism characteristic in the second embodiment.
Figure 13B:
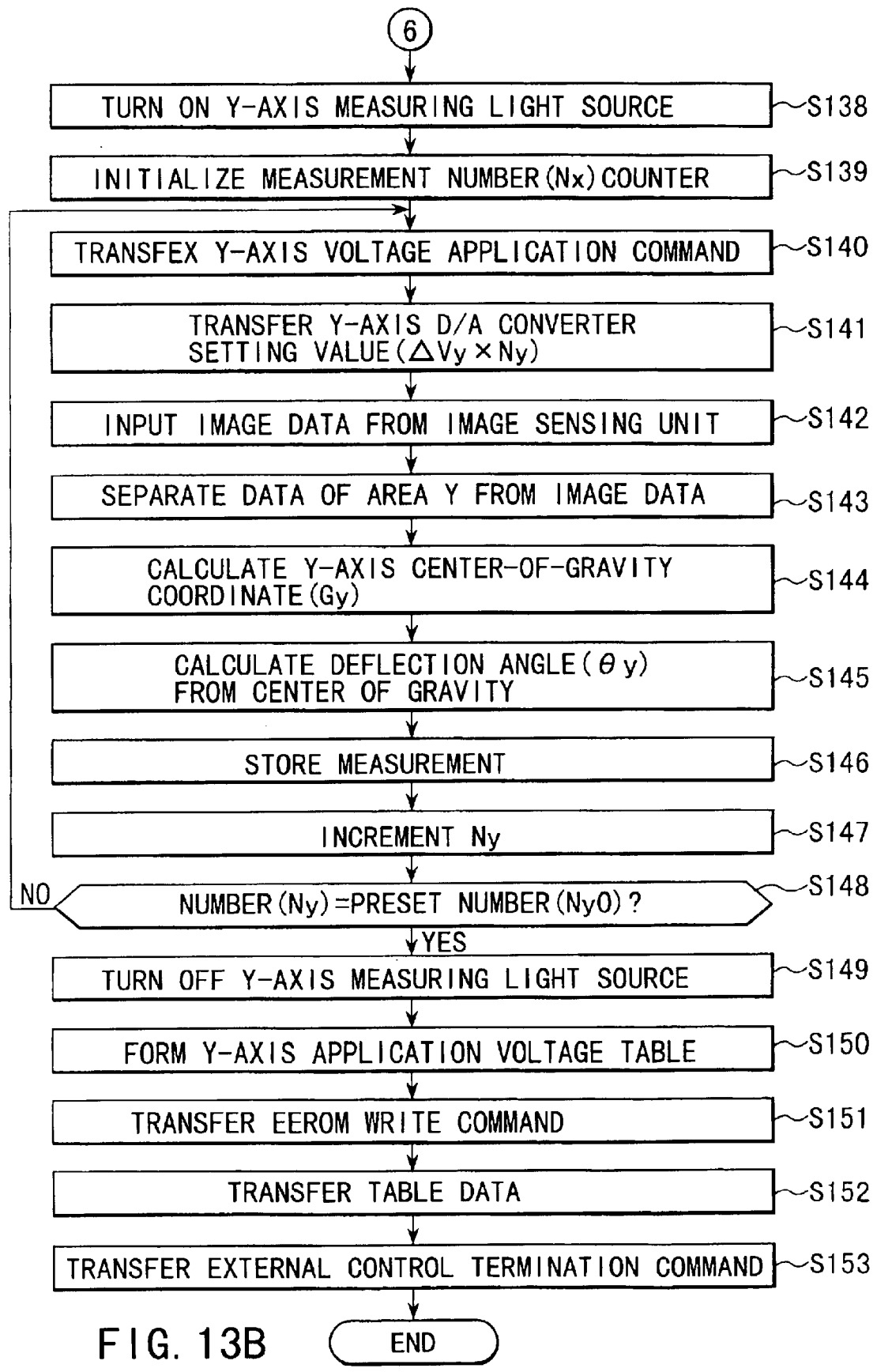

Next, a program executed on the external control device when the prism characteristic is measured, a data table necessary for control of the wedge prism is formed and the data table is stored into the EEPROM of the camera is explained with reference to the flowcharts shown in FIGS. 13A and 13B.

First, a communication request is issued from the external control device 33 to the camera (step S121). The communication request is detected in the step S72 shown in FIG. 11. The CPU 4 of the camera executes the sub-routine external control model explained with reference to FIG. 12.

Next, the X-axis measuring light source 54 in the reference light source unit 53 is lit (step S122). After the light source is lit, parameters ($\Delta Vx$, $Nx$, $\Delta Vy$, $Ny$) indicating the measurement condition are input to the external control device 33 (step S123). The inputting operation is effected by an operator of the manufacturing line for effecting the measurement operation or an operator of the repair center.

After the measurement number counter (Nx) is cleared (step S124), a command indicating the X-axis voltage application is transferred to the CPU 4 (step S125). The count (Nx) of the counter is multiplied by the voltage $\Delta Vx$ which is one of the measurement parameters to determine a voltage applied to the wedge prism 20 and voltage data thereof is transferred to the CPU 4 (step S126).

The CPU 4 of the camera applies a voltage to the X-axis wedge prism 20a based on the transferred command indicating the X-axis voltage application and voltage data applied to the x-axis wedge prism 20a and then controls the image sensing unit 79 to cause the external control device 33 to fetch image data (step S127) and takes out data of the area X from the image data (step S128).

In the first embodiment, the area X is an area on the CCD of the image sensing unit 79 having the same significance as the area X shown in FIG. 8. The center of gravity (Gx) of image data of the area X is derived in the same manner as in the step S38 of FIG. 7 (step S129). A deflection angle ($\theta x$) of the light beam obtained by the X-axis wedge prism is derived by multiplying the thus derived center of gravity Gx by a preset coefficient (step S130). They are temporarily stored into a memory of the external control device 33 with the deflection angle $\theta x$ of the light beam and the application voltage ($\Delta Vx \cdot Nx$) set to correspond to each other (step S131).

After this, the measurement number counter (Nx) is incremented (+1) (step S132) and whether or not the count reaches a preset number (Nxo) which is one of the parameters indicating the measurement condition is determined (step S133). If the result of the above determination does not indicate that the count reaches Lthe preset number Nxo (NO), the process returns to the step S125 and the measurement operation is continued. If the result of the above determination indicates that the count reaches the preset number Nxo (YES), generation of the X-axis timing signal is interrupted and then the X-axis measurement light source 54 is turned OFF (step S134).

Next, table data which will be used for the succeeding control of the wedge prism is formed based on the relation between the application voltage ($\Delta Vx \cdot Nx$) and the deflection angle $\theta x$ of the light beam derived in the processing operation in the steps S124 to S133 (step S135). After formation of the table data, an EEPROM write command is transferred to the CPU 4 (step S136). The formed table data is transferred to the CPU 4 (step S137). The CPU 4 which has received the command and table data stores the table data into the EEPROM 19 in the step S110 of FIG. 12.

By the above measurement and operation, the table data indicating the relation between the voltage data applied to X-axis wedge prism 20a and the deflection angle $\theta x$ of the light beam is derived. Next, the characteristic of the Y-axis wedge prism 20b is measured and table data is formed. In the table forming operation, the process equivalent to that for the X-axis wedge prism 20a is effected and therefore the detail explanation therefor is omitted.

In the Y-axis wedge prism 20b, the process equivalent to the process of the steps S122 to S137 is effected to from table data of the Y-axis wedge prism 20b and store the same into the EEPROM 19.

Then, after the respective table data items of the X-axis wedge prism 20a and Y-axis wedge prism 20b are stored into the EEPROM 19, an external control termination command is transferred to the CPU 4 from the external control device 33. The CPU 4 which has received the above command terminates the operation of the sub-routine "external control mode" shown in FIG. 12.

Figure 14:
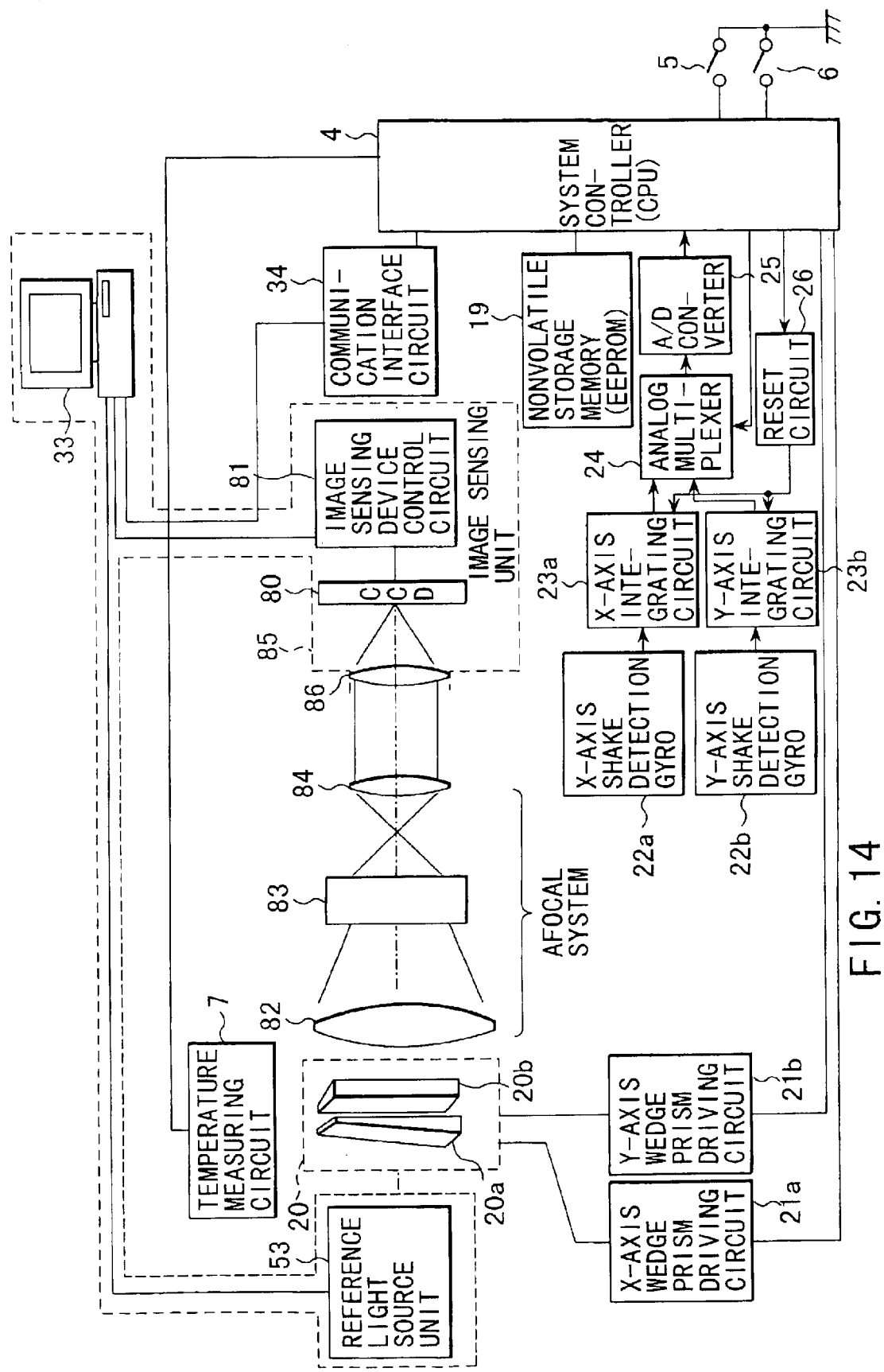
FIG. 14 is a diagram-showing an example of the schematic construction of an optical device other than a camera which contains a shake correction device according to a third embodiment of this invention.

FIG. 14 shows an example of the schematic construction of a shake correction device mounted on an optical device other than a camera, for example, an optical device such as a telescope or binocular as a third embodiment of this invention. Constituents in this embodiment which are equivalent to those of the first and second embodiments are denoted by the same reference numerals and the explanation therefor is omitted.

The lens system of the optical device includes a wedge lens 20 for shake correction, objective 82, erect prism 83 and eyepiece 84.

With the above construction, a subject image formed by the objective 82 is magnified by the eyepiece 84 and is made incident on the eyes of an observer (not shown). In this case, the erect prism 83 is disposed between the objective 82 and the eyepiece 84 to constitute an a focal system for making erect the subject image formed by the objective 82.

Since the optical system of this embodiment is a focal system, the light beam emitted from the eyepiece 84 is parallel. Therefore, even if the image sensing unit 79 used in the second embodiment is disposed behind the eyepiece 84, no image is formed on the light receiving surface of a CCD 80.

Therefore, an image sensing unit 85 used in this embodiment has a collimator lens 86 disposed between the eyepiece 84 and the CCD 80 so as to re-form an image on the CCD 80 by focusing the light beam emitted from the eyepiece 84.

After this, like the second embodiment, the operation for measuring the characteristic of the wedge prism 20 is effected by use of the light beam focused on the light receiving surface of the CCD 80.

Other than the wedge prism 20 used in the above embodiments, it is also possible to use a variable apex angle prism which is formed by sealing a liquid having an index of refraction into a space between two glass plates and which can change the direction of a light beam passing therethrough by changing the angle made by the two glass plates by use of an actuator. As the actuator, a voice coil or the like can be used.

Measurement of the characteristic of the prism can be made by use of the method for measuring the characteristic of the prism of the above embodiment.

The technology for measuring the characteristic of the anti-vibration (vibration preventing) optical system according to the embodiment described before can be applied not only to the wedge prism but also to an optical device for shifting or tilting part of the conventional photographing lens to attain the anti-vibration operation on the manufacturing line or the product checking line.

As described above, the reference light source unit used in the above embodiments requires two light sources including the X-axis measurement light source and Y-axis measurement light source. However, measurement of the characteristic of the wedge prism can be made by use of only one spot light source.

Figure 15:
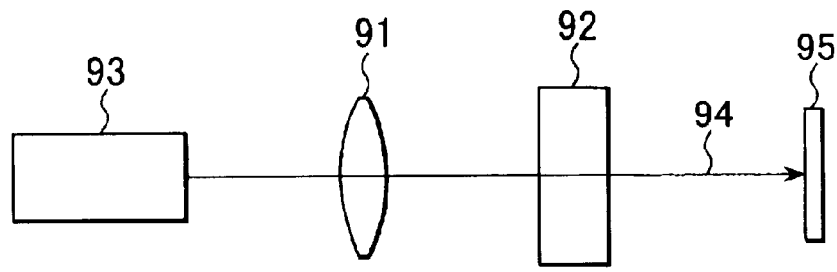
FIG. 15 is a view showing a modification for measuring the prism characteristic by use of a one spot light source.
Figure 16:
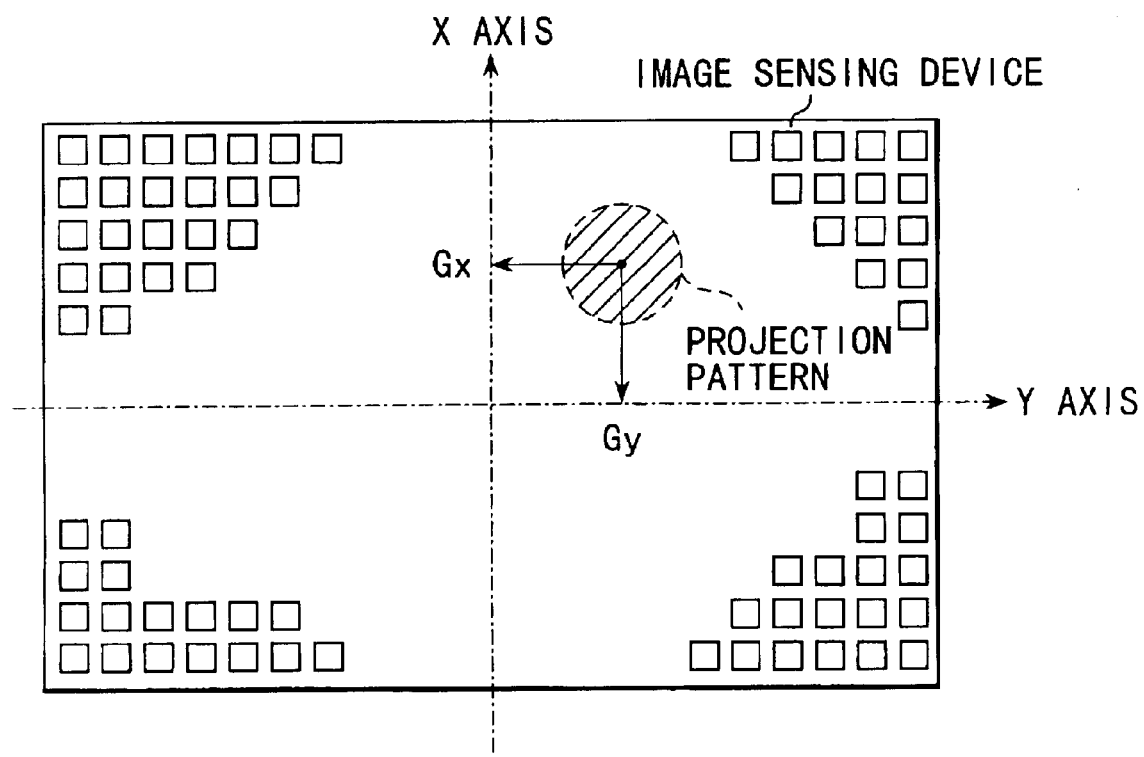
FIG. 16 is a view showing a pattern of spot light applied to the image sensing device in the case of the modification for characteristic measurement shown in FIG. 15.

For example, FIG. 15 shows a modification for measuring the wedge prism characteristic and a shake correction wedge prism 92 is disposed along the optical axis of a photographing lens 91 and spot light 94 is made incident on an image sensing device 95 from a light source 93. As the light source 93, a laser may be used. The spot light 94 from the light source 93 forms a pattern as shown in FIG. 16 on the image sensing device 95.

By deriving the coordinate position (Gx, Gy) of the center of gravity of the pattern, the relation between the voltage and the deflection angle is made clear as already explained. However, even if image data (areas X, Y) only in specified areas as shown in FIG. 8 is used, the coordinate position of the center of gravity cannot be attained.

This is because the state of the Y-axis prism is indefinite when the characteristic of the X-axis prism is measured. Therefore, a projection pattern does not always exist on the area X. As a result, it is necessary to read out all of the image data and obtain the coordinate position of the projection pattern. This indicates that the operation for deriving the coordinate position becomes complicated.

The CCD image sensor is used as the sensor for measuring the coordinates of the projection pattern in the image sensing unit used in the above embodiments, but it is also possible to use a 2-dimensional PSD (a device for detecting the position of a light spot).

As described above in detail, according to this invention, it is possible to provide a shake correction device in which parameters indicating the relation between the deflection angle of a light beam and application voltages to the wedge prisms used in the shake correction device mounted on the optical device such as the camera are derived and stored and a shake correction amount based on a shake amount detected at the time of shake correction is corrected according to the parameters to effect the adequate shake correction operation.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An adjustment system for a camera having a shake correction function, the adjustment system comprising:

a reference light source unit which collimates light emitted from a slit and generates a reference light;

the camera including:

a photographing lens;

an image sensing device for converting a subject image formed by an optical element to image data;

a shake detecting section including a first shake angle detection section for detecting a shake angle in a first axial direction arid a second shake angle detecting section for detecting a shake angle in a second axial direction perpendicular to the first axial direction;

a wedge prism formed of optical material in which an index of refraction changes corresponding to a voltage applied thereto and disposed on the photographing lens, the wedge prism changing an angle of a light beam passing therethrough in accordance with the voltage applied thereto;

an application voltage generating section for generating the voltage applied to the wedge prism;

a storage section for storing the relation between the voltage applied to the wedge prism and an angle of deviation of the light beam passing through the wedge prism;

a control section for determining a voltage to be applied to the wedge prism based on an output of the shake detecting section and an output of the storage section and controlling the voltage generating section to generate the thus determined application voltage; and a setting section for setting an image sensing mode for image-sensing the subject image and a test mode for measuring the relation between the voltage applied to the wedge prism and the angle of deviation of the light beam passing through the wedge prism; and an external control device which obtains the image data from the image sensing device, determines a position of the reference light, forms an image on the image sensing device, prepares a data table indicating the relation between the voltage applied to the wedge prism and the angle of deviation of the light beam passing through the wedge prism, and stores the data table in the storing section.

2. An adjustment system for a camera having a shake correction function, the adjustment system comprising:

a reference chart having two slit marks; the camera including:

a photographing lens;

an image sensing device for converting a subject image formed by the optical element to image data;

a shake detecting section including a first shake angle detecting section for detecting a shake angle in a first axial direction and a second shake angle detecting section for detecting a shake angle in a second axial direction perpendicular to the first axial direction;

a wedge prism formed of optical material in which an index of refraction changes corresponding to a voltage applied thereto and disposed on the photographing lens, the wedge prism changing an angle of a light beam passing therethrough according to a voltage applied thereto;

an application voltage generating section for generating a voltage applied to the wedge prism;

a storage section for storing the relation between the voltage applied to the wedge prism and an angle of deviation of the light beam passing through the wedge prism;

a control section for determining a voltage to be applied to the wedge prism based on an output of the shake detecting section and an output of the storage section and controlling the voltage generating section to generate the thus determined application voltage; and a setting section for setting an image sensing mode for image-sensing the subject image and a test mode for measuring the relation between the voltage applied to the wedge prism and the angle of deviation of the light beam passing through the wedge prism; and an external control device which fetches the image data from the image sensing device, determines a position of the reference chart, forms an image on the image sensing device, prepares a data table indicating the relation between the voltage applied to the wedge prism and the angle of deviation of the light beam passing through the wedge prism, and stores the data table in the storing section.

3. An adjustment system for a camera having a shake correction function, the adjustment system comprising:

a reference light source unit which generates a spot light by a laser beam;

the camera including:

a photographing lens, an image sensing device for converting a subject image formed by the optical element to image data;

a shake detecting section including a first shake angle detecting section for detecting a shake angle in a first axial direction and a second shake angle detecting section for detecting a shake angle in a second axial direction perpendicular to the first axial direction;

a wedge prism formed of optical material in which an index of refraction changes corresponding to a voltage applied thereto and disposed on the photographing lens, the wedge prism changing an angle of a light beam passing therethrough according to a voltage applied thereto;

an application voltage generating section for generating a voltage applied to the wedge prism;

a storage section for storing the relation between the voltage applied to the wedge prism and an angle of deviation of the light beam passing through the wedge prism;

a control section for determining a voltage to be applied to the wedge prism based on an output of the shake detecting section and an output of the storage section and controlling the voltage generating section to generate the thus determined application voltage; and a setting section for setting an image sensing mode for image-sensing the subject image and a test mode for measuring the relation between the voltage applied to the wedge prism and the angle of deviation of the light beam passing through the wedge prism; and an external control device which fetches the image data from the image sensing device, determines a position of the spot light, forms an image on the image sensing device, prepares a data table indicating the relation between the voltage applied to the wedge prism and the angle of deviation of the light beam passing through the wedge prism, and stores the data table in the storing section.

* * * * *